US009998339B1

United States Patent
Brajkovic et al.

(10) Patent No.: US 9,998,339 B1
(45) Date of Patent: Jun. 12, 2018

(54) APPLICATION AWARENESS FOR VIRTUAL INFRASTRUCTURE ENVIRONMENTS

(71) Applicant: COMTRADE SOFTWARE INC., Boston, MA (US)

(72) Inventors: Mladen Brajkovic, Grosuplje (SI); Dusan Vucko, Kranj (SI)

(73) Assignee: COMTRADE SOFTWARE INC., Boston, MA (US)

( * ) Notice: Subject to any disclaimer, the term of this patent is extended or adjusted under 35 U.S.C. 154(b) by 0 days. days.

(21) Appl. No.: 15/607,139

(22) Filed: May 26, 2017

Related U.S. Application Data

(60) Provisional application No. 62/455,306, filed on Feb. 6, 2017.

(51) Int. Cl.
| | |
|---|---|
| G06F 15/173 | (2006.01) |
| H04L 12/24 | (2006.01) |
| G06F 9/455 | (2018.01) |
| G06F 17/30 | (2006.01) |
| H04L 29/08 | (2006.01) |

(52) U.S. Cl.
CPC ...... *H04L 41/5058* (2013.01); *G06F 9/45558* (2013.01); *G06F 17/30864* (2013.01); *G06F 2009/45562* (2013.01); *G06F 2009/45591* (2013.01); *H04L 67/10* (2013.01)

(58) Field of Classification Search
CPC . H04L 41/5058; H04L 67/10; G06F 9/45558; G06F 17/30864; G06F 2009/45591; G06F 2009/45562
See application file for complete search history.

(56) References Cited

U.S. PATENT DOCUMENTS

| | | | |
|---|---|---|---|
| 8,103,906 B1 * | 1/2012 | Alibakhsh | H04L 67/1002 714/13 |
| 8,849,947 B1 | 9/2014 | Artzi et al. | |
| 8,924,930 B2 * | 12/2014 | Fries | G06F 9/45558 717/101 |

(Continued)

OTHER PUBLICATIONS

[No Author Listed], Agentless Monitoring With Nagios. Agentless Monitoring—Nagios. https://www.nagios.com/solutions/agentless-monitoring/ last accessed Mar. 24, 2017. 2 pages.

(Continued)

*Primary Examiner* — Dhairya A Patel
(74) *Attorney, Agent, or Firm* — Wolf, Greenfield & Sacks, P.C.

(57) ABSTRACT

An application awareness system for a virtualized infrastructure. The application awareness system may use commands in standardized protocols to obtain data from virtual entities in the virtualized infrastructure. The data may be processed to indicate applications on specific virtual entities. The application awareness system may interact with those applications to gain information about the configuration of the application, or for a distributed application, components of the application on each of the plurality of virtual entities. These techniques may be applied to both virtual machines and containers, generating data that may be used in any of multiple management functions performed on the virtual infrastructure, such as backup, monitoring and resource allocation.

23 Claims, 20 Drawing Sheets

(56) References Cited

U.S. PATENT DOCUMENTS

| | | | | |
|---|---|---|---|---|
| 8,972,987 | B2* | 3/2015 | Ciano | G06F 9/45533 718/1 |
| 9,313,281 | B1* | 4/2016 | Lietz | H04L 67/16 |
| 2008/0134175 | A1* | 6/2008 | Fitzgerald | G06F 9/45533 718/1 |
| 2009/0327462 | A1* | 12/2009 | Adams | G06F 9/5077 709/222 |
| 2012/0278628 | A1* | 11/2012 | Chen | G06F 21/6254 713/176 |
| 2016/0055045 | A1* | 2/2016 | Souza | G06F 11/0712 714/57 |

OTHER PUBLICATIONS

[No Author Listed], Application Discovery. Automatic Application Discovery—See What's Actually Running Right Now. https://www.appensure.com/application-discovery/ last accessed Mar. 24, 2017. 3 pages.

[No Author Listed], AWS Application Discovery Service User Guide. Amazon Web Services™. 2017. 48 pages.

[No Author Listed], CA Unified Infrastructure Management for SAP Basis. CA Technologies. 2014. 2 pages.

[No Author Listed], CA Unified Infrastructure Management Probes. https://docops.ca.com/ca-unified-infrastructure-management-probes/ga/en last accessed Mar. 24, 2017. 1 page.

[No Author Listed], Discovery Process Overview. IBM Knowledge Center. https://www.ibm.com/support/knowledgecenter/SSPLFC_7.3.0/com.ibm.taddm.doc_7.3/AdminGuide/c_cmdb_discoveryourview.html last accessed Mar. 24, 2017. 2 pages.

[No Author Listed], Ensure Consistent Service Levels Across Multiple Applications. CA Unified Infrastructure Management for Application Monitoring. https://www.ca.com/us/products/ca-unified-infrastructure-management/ca-unified-infrastructure-management-for-application-monitoring.html last accessed Mar. 24, 2017. 3 pages.

[No Author Listed], How a sensor discovers configuration items. IBM. https:www.ibm.com/support/knowledgecenter/SSPLFC_7.3.0/com.ibm.taddm.doc_7.3/AdminGuide/c_cmdb_howsensordiscovers.html last accesses Mar. 24, 2017. 2 pages.

[No Author Listed], Monitor Custom and Home-Grown Applications. SolarWinds. http://www.solarwinds.com/topics/custom-application-monitoring last accessed Mar. 24, 2017. 4 pages.

[No Author Listed], Nagios. Wikipedia. https://en.wikipedia.org/wiki/Nagios last accesses Mar. 24, 2017. 4 pages.

[No Author Listed], Nimsoft® Monitor™. Xendesktop Guide V1.0 Series. CA Technologies. 2012. 50 pages.

[No Author Listed], Sensors. IBM Tivoli Application Dependency Discovery Manager, Version 7.3. IBM Knowledge Center—Sensors. https://www.ibm.com/support/knowledgecenter/SSPLFC_7.3.0/com.ibm.taddm.doc_7.3/AdminGuide/c_cmdb_sensors.html last accessed Mar. 24, 2017. 1 page.

Drogseth, EMA Radar™ for Application Discovery and Dependency Mapping (ADDM): Q4 2013. AppEnsure Profile. Enterprise Management Associates® (EMA™) Radar Report. Dec. 2013. 8 pages.

[No Author Listed], Application-Aware Porcessing. VEEAM Help Center. https://helpcenter.veeam.com/docs/backup/vsphere/application_aware_processing.html?ver=95 Last accessed Sep. 15, 2017. 2 pages.

[No Author Listed], Configure WinRM and PowerShell. Nimsoft. http://docs.nimsoft.com/prodhelp/en_US/Probes/Catalog/xendesktop/1.0/index.htm?toc.htm?2096344.html Last accessed Sep. 15, 2017. 2 pages.

[No Author Listed], Ensure Consistent Service Levels Across Multiple Applications. CA Technologies. https://www.ca.com/us/products/ca-unified-infrastructure-management/ca-unified-infrastructure-management-for-application-monitoring.html Last accessed Sep. 15, 2017. 1 page.

* cited by examiner

```
Host: 'platform_1-sql-1'  712
Application: SQL Server 2012 Database Engine Services
Version: 11.0
SQL Server details:
  - Id: f8f55e5c-7129-4115-8144-34598789f800
  - Name: AGTestGroup  716
  - Owner: PLATFORM_1-SQL-2
  - PossibleOwners: PLATFORM_1-SQL-1; PLATFORM_1-SQL-2
  - Type: SQL Availability Group  714
  - SqlInstance: platform_1-sql-1\ALWAYSON
```
— 710

— 700

```
Host: 'sccm-xd01-ng'
Application: XenDesktop  722
Version: 7.7
XenDesktop site name: CitrixSiteMG1
XenDesktop site ID: 8bc5b39a-5287-41bc-950f-38351ace7dc9
TOPOLOGY
Host: platform_2.si      724    Role: License Server    726
Host: sccm-xddb01-ng            Role: Database Server
Host: sccm-xd01-ng.sccmng.local Role: Delivery Controller
Host: sccm-xd02-ng.sccmng.local Role: Delivery Controller
Host: dummyng01.sccmng.local    Role: Machine
Host: dummyng02.sccmng.local    Role: Machine
```
— 720

FIG. 7

```
#Pseudo Code to enumerate Xendesktop Machine Catalogs

Load Citrix Modules
Identify XenDesktop Machines

For each identified XenDesktop Machine:
    Output server name
    Output machine session
```

FIG. 15B

APPLICATION AWARENESS FOR VIRTUAL INFRASTRUCTURE ENVIRONMENTS

RELATED APPLICATIONS

This Application claims priority under 35 U.S.C. § 119(e) to U.S. Provisional Application Ser. No. 62/455,306, entitled "APPLICATION AWARENESS FOR VIRTUAL INFRASTRUCTURE ENVIRONMENTS" filed on Feb. 6, 2017, which is herein incorporated by reference in its entirety.

BACKGROUND

In enterprise computer environments, it is often desirable to know what applications are running on specific virtual entities. Some applications may be business critical, such as a database application that manages all current sales transactions for the business, for example. Other applications may be important, but less critical, such as a server that hosts the website for the company. Other applications, such as a server that hosts an intranet for sharing employee news, may be less critical.

Knowledge of the specific applications executing on each of multiple computers, for example, may be used to better manage the computer system of the enterprise. That knowledge may be used to set a data protection policy, with data generated from computers running critical applications being replicated or copied to remote storage more frequently. As another example, that knowledge may be used to balance load, such as by running applications that require significant computing resources on computers that are not running other applications. Furthermore, the knowledge may be used to monitor applications executing on the computer systems of the enterprise.

To determine which applications execute on specific machines, agents may be deployed on those machines. The agents may be designed to work with specific applications and may count the number of instances of the application running on the computer and report back to a centralized controller.

SUMMARY

The inventors have recognized and appreciated techniques for operating an enterprise computing system to collect information about applications running on entities. In addition, in some embodiments, information about a configuration of an application may also be collected. These techniques may be applied to determine applications installed or present on virtual entities in a virtualized environment.

According to one aspect, a system is provided for gathering information from a distributed computer system implementing a virtual infrastructure, the virtual infrastructure comprising a plurality of virtual entities. The system comprises: a network interface; a memory; at least one processor operatively connected to the network interface and the memory; and a non-transitory computer readable medium comprising computer executable instructions, that, when executed by the at least one processor, implement: an application discovery component configured to: execute, via the network interface, a protocol associated with an operating system of a plurality of operating systems to establish a control path with the operating system, wherein the operating system is running on a virtual entity of the plurality of virtual entities; transmit, via the control path, a first set of program instructions to the virtual entity that, when executed by the virtual entity, query an application registry associated with the operating system of the virtual entity for information associated with one or more applications; receive, via the control path responsive to the query, a first set of data; determine, from the first set of data, one or more applications installed on the virtual entity; and based on the determination of the one or more applications are installed, selectively store in the memory, information specifying that the one or more applications are installed on the virtual entity; a plurality of application probes, each application probe associated with an application and configured to: select a second set of program instructions based on at least one of the one or more applications; transmit, via the control path, the second set of program instructions to the virtual entity; receive, responsive to execution of the second set of program instructions by the virtual entity, a second set data from the virtual entity; determine, from the second set of data, a configuration of the at least one of the one or more applications; store, in the memory, information specifying the determined configuration of the at least one of the one or more applications; and output the configuration information to a virtual infrastructure management system, wherein the virtual infrastructure management system comprises a data backup service or a monitoring service.

According to one embodiment, the application discovery component is further configured to: transmit, to the virtual entity via the control path, a third set of program instructions that, when executed by the virtual entity, search for a trace of an application on the virtual entity; receive, responsive to the execution, a third set of data indicative of whether the trace is detected on the virtual entity; and determine, from the third set of data, if the application is installed on the virtual entity. According to another embodiment, the application discovery component is further configured to transmit the third set of program instructions responsive to determining, from the first set of data, that the application is not installed on the virtual entity.

According to one embodiment, the non-transitory computer readable medium comprises computer executable instructions, that, when executed by the at least one processor, further implement a controller that is configured to execute the application discovery component and at least one of the plurality of application probes responsive to detecting an addition of a new virtual entity to the virtual infrastructure.

According to one embodiment, the non-transitory computer readable medium comprises computer executable instructions, that, when executed by the at least one processor, further implement a scheduler that is configured to execute the application discovery component and at least one of the plurality of application probes responsive to detecting an expiration of a time period.

According to one embodiment, the non-transitory computer readable medium comprises computer executable instructions, that, when executed by the at least one processor, further implement a controller configured to: execute a first stage in which the controller executes the application discovery component; and execute a second stage in which the controller executes a set of application probes of the plurality of application probes. According to another embodiment, the controller component is further configured to: identify, responsive to execution of the first stage, a set of applications determined to be installed on the virtual entity; and select, prior to execution of the second stage, the set of application probes such that each application probe of the set of application probes is associated with an application of the set of applications.

According to one aspect, a computer-implemented method for gathering information about a virtual infrastructure comprising a plurality of virtual entities is provided. The method comprises: executing, by an application discovery component via a network interface, a protocol associated with an operating system of a plurality of operating systems to establish a control path via an interface of the operating system configured for communication according to the protocol, wherein the operating system is running on a virtual entity of the plurality of virtual entities; accessing, by the application discovery component via the control path, first data associated with one or more applications in a data set associated with the operating system of the virtual entity; determining, by the application discovery component from the first data, that a particular application is installed on the virtual entity; and selecting an application probe based on the determined particular application; initiating, by the selected application probe, via the control path, execution of program instructions at the virtual entity; receiving, by the application probe second data from the virtual entity generated based on execution of the program instructions at the virtual entity; determining, by the application probe based on the second data, a configuration of the particular application on the virtual entity; and outputting to a virtual infrastructure management system, the configuration information.

According to one embodiment, the method further comprises determining, by the application probe, that the particular application is distributed across a set of virtual entities. According to another embodiment, the method further comprises identifying and storing, by the application probe responsive to determining that the particular application is a distributed application comprising a plurality of components, a role of a component of the distributed application installed on the virtual entity.

According to one embodiment, the method further comprises determining that the virtual entity has a unique IP address.

According to one embodiment, the method further comprises recognizing that the virtual entity is a container and that the operating system is running on a host machine of the container.

According to one embodiment, the method further comprises determining a structure of one or more containers running on the host machine and identifying an ID of the container.

According to one embodiment, the method further comprises removing all sets of program instructions transmitted to the virtual entity and any items produced on the virtual entity as a result of execution of the sets of program instructions.

According to one aspect, a computer-implemented method of collecting application information in a virtual infrastructure is provided, The method comprises: from an application discovery component, transmitting queries to each of a plurality of virtual entities within the virtual infrastructure, wherein the queries are formatted to elicit data from the plurality of virtual entities indicating presence of applications; from a probe deployment component, communicating to virtual entities of the plurality of virtual entities computer executable instructions; executing the computer executable instructions at the virtual entities to retrieve information about application configurations on respective ones of the plurality of virtual entities; and storing data about applications running on the plurality of virtual entities and configuration of the applications based on data received in response to the queries and received as a result of executing the computer-executable instructions.

According to one embodiment, the method further comprises assigning computational resources to the plurality of virtual entities based on the data about applications running on the plurality of virtual entities and the configuration of the applications.

According to one embodiment, the act of retrieving information about application configurations comprises discovering a role of a component of a portion of a distributed application executing on a virtual entity of the plurality of virtual entities.

According to one embodiment, the act of transmitting queries to each of the plurality of virtual entities comprises querying operating system registries on the virtual entities.

According to one embodiment, the computer executable instructions comprise scripts that are automatically executed on virtual entities upon deployment.

According to one embodiment, the act of transmitting queries to each of the plurality of virtual entities is performed on a time schedule.

According to one embodiment, the act of transmitting queries to each of the plurality of virtual entities is performed in response to detecting that a virtual entity has been added to the virtual infrastructure.

According to one embodiment, the act of transmitting queries to each of the plurality of virtual entities comprises transmitting via a communication mechanism of an operating system of the virtual entities.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 is a textual representation of data containing exemplary information that may be received by running application probes in accordance with some embodiments described herein;

FIGS. 15A-C are example sets of pseudocode of program instructions that may be used to obtain information from a virtual entity, in accordance with some embodiments described herein.

DETAILED DESCRIPTION

Figure 1:
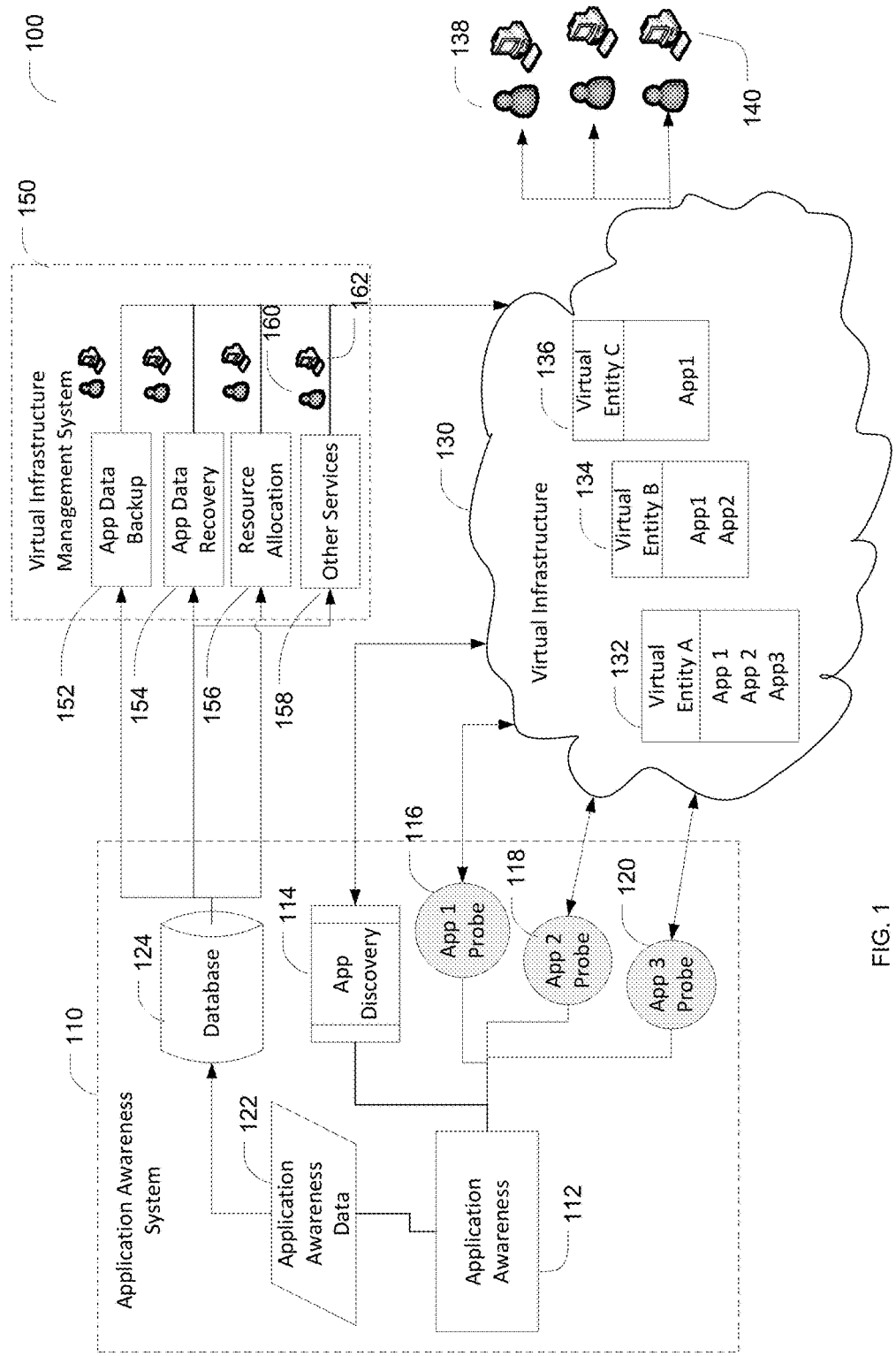
FIG. 1 is a block diagram of an illustrative system 100 in which digital interactions may take place, in accordance with some embodiments described herein.

The inventors have recognized and appreciated that identifying applications executing on specific virtual entities, without the need to deploy agents on the virtual entities, may significantly enhance the management of an enterprise computer system. In accordance with some embodiments, applications may be identified for probing for information directly indicating the presence of one or more applications on virtual entities within a virtual infrastructure of an enterprise computer system.

A direct indication, for example, may be obtained from application information maintained by the operating system of the virtual entity on which the application is detected. Where direct indications of an application are not identified, applications may be detected indirectly, such as by finding traces indicative of the application. When sufficient indications of an application are detected, that application may be deemed to have been detected.

The information about executing applications may be obtained from any suitable dataset maintained by or for the virtual entity. The dataset may act as a registry of applications. The registry may be formatted as a database that stores information about applications installed on a virtual entity. Such a registry, for example, may be managed by an operating system of the virtual entity with applications writing data to the database as they are installed. However, it is not a requirement that information about installed applications be obtained from a registry be specifically created as a repository of information about applications, as any set of information, in any accessible format, may serve as a dataset from which information about an application may be obtained.

As another example, in some embodiments, information about installed applications may be obtained from the presence of files in a directory. The files, for example, may provide information about executing processes, with, for example, one file per process. The operating system, or other suitable component, may create in a predetermined directory a file for each process as the process is launched. By accessing contents of the files in that directory, information about each executing process may be determined, and that information may indicate the application that initiated the process. In this way, the set of files in in that directory may serve as a dataset holding information about executing applications.

As another example, in some embodiments, information about installed applications may be stored in initialization, configuration or other types of files associated with respective applications may serve as a dataset from which application information may be obtained. In some embodiments, the presence of a file may indicate that a specific application is installed. For example, an application may have an initialization file with a unique name such that, if an initialization file with a name associated with that application is found on a computer, the system may deem that the application is present. In other embodiments, data within a file may indicate that an application is installed. An initialization file, for example, may contain commands or metadata identifying an application, based on which the system may deem that the application is installed. These files may be stored in one or more directories or other predefined locations in computer memory associated with the virtual entity such that identifying files or other data sets stored in those locations indicates installed applications. Alternatively, all or portions of the computer memory associated with a virtual entity may be searched for files or other data of a type indicating the presence of an application.

In some embodiments, the information obtained from a data store may indicate that an application is installed on the virtual entity, but may not reveal whether the application is executing. In some embodiments, further processing may be performed, once an installed application is identified to determine whether the application is executing. That further processing, may include interacting with the application, which might only be possible if it is executing, or otherwise determining if it is executing. Accordingly, it should be appreciated that any suitable technique or combinations of techniques may be employed to identify executing applications on each virtual device of a plurality of virtual devices.

However, the inventors have recognized that techniques that enable an application awareness system to gain information about applications through standardized interfaces at the virtual entities may greatly expand the utility of the application awareness system. The interfaces may be generic interfaces supported by an operating system at a virtual entity on which applications might execute. Using such standardized interfaces, rather than special software or special interfaces installed on the virtual entities, may significantly expand the set of applications that can be discovered on specific virtual entities. In accordance with some embodiments, standard operating system protocols are used to extract information from virtual entities. Standard protocols may be used to transmit program instructions to a virtual entity that, when executed by the virtual entity, may retrieve information indicating presence or lack of presence of applications. The information extracted using those standard protocols, including information as described above that is read from a registry, may be processed to determine presence of one or more applications.

In addition to detecting presence of an application of interest, information about its configuration may be detected. For example, the size of a data store maintained by the application or the role of an application instance on the virtual entity in a distributed application may be detected. This configuration information may be used in various system management functions. For example, when an application is made up of multiple components that may be distributed across multiple virtual entities, identifying the role of the components executing on each virtual machine may be used in setting a backup policy or in assigning resources to the virtual entity. As a specific example, an application may have some components that implement processing nodes and storage nodes. As a virtual infrastructure enables resources to be allocated to different virtual entities, the processing nodes may be allocated more processing resources than the storage nodes. In contrast, the storage nodes may be allocated more memory resources than the processing nodes. As another example, when establishing a backup policy, the storage nodes may be backed up more frequently than the processing nodes. Accordingly, it should be appreciated that configuration information may be used in any of multiple ways.

As the application awareness system may collect configuration information after applications have been discovered, the application awareness system may rely on information already gathered about the application to gain information about the configuration of the application. Configuration information, for example, may be collected in any suitable way, such as by making calls through interfaces of the application, or examining files through the file system. In some embodiments, these calls may be made from a self-deleting script that may be installed on the virtual entity. That script may be configured to access configuration information and send it back to the application awareness system.

Regardless of how this information is detected, it may be used for reporting and management services.

FIG. 1 shows an illustrative system 100 via which digital interactions may take place, in accordance with some embodiments. In this example, the system 100 includes an application awareness system 110, a virtual infrastructure management system 150, and a virtual infrastructure 130.

In some embodiments the application awareness system 110 may interact with a virtual infrastructure 130 that comprises a plurality of virtual entities, such as virtual entities 132, 134, and 136. Each virtual entity may comprise an emulation of a physical computing device on which applications may be installed and executed. The virtual entity may comprise underlying hardware resources, which may be programmed, which as with software sometimes referred a hypervisor, to emulate one or more virtual entities. In many scenarios, a virtual entity may share physical resources with other virtual entities. Each virtual entity may have a set of applications installed on it. Virtual entities may be accessed by users 138 using computers or other devices (e.g. devices 140), which may be coupled, such as over a computer network, to the hardware resources on which the virtual entities execute. The user may access the virtual entity over a network such as the Internet. The virtual infrastructure 130 may instantiate a virtual entity to use for the user. The user may then utilize the virtual entity as its own machine with its own set of installed applications.

In some embodiments, a virtual entity may comprise a virtual machine. A virtual machine is a virtualized computer emulation that runs its own operating system. Other types of virtual entities are possible. For example, a virtual entity may comprise a container. A container is a virtualized computer emulation that shares physical hardware resources and portions of an operating system with other containers.

An enterprise may establish a virtual infrastructure 130, containing one or more virtual entities. For example, an IT administrator for the enterprise may configure one or more physical servers to host virtual entities. Applications, or portions of applications may be loaded on each virtual entity. The characteristics of each virtual entity may be configured by the IT administrator. For example, some virtual entities may be set up so that they can access large amounts of data storage while other virtual entities may be set up to access relatively small amount of data storage. Other virtual entities may be configured so that they consume a relative high percentage of available processing cycles of the underlying physical hardware, while other virtual entities may be configured to consume relatively small amounts of available processing cycles. An IT administrator may configure the virtual entities based on the types of applications that the IT administrate can ascertain are loaded on the virtual entity or expects to be loaded on it. Such a virtual infrastructure may be created in any suitable way, including using technology as is known in the art.

In some embodiments, various management services may be executed on virtual infrastructure 130. The virtual infrastructure management system 150 may include one or more components to execute these services. One or more users 160, which may be IT administrators for an enterprise, for example, may access these services using computers or other suitable devices 162. These services may include data backup service 152, data recovery service 154, resource allocation service 156 and other services 158. Such services may be implemented in any suitable way, including using techniques and components as are known in the art.

In some embodiments, the management services may be configured based on the applications installed on the virtual entities in the virtual infrastructure 130. Information about the applications installed on each virtual entity may be obtained in any suitable way, including based on user input. However, in embodiments described herein information about applications installed on each virtual entity may be obtained, in whole or in part, from application awareness system 110. As a result more information about applications installed on each virtual entity may be available or that information may be obtained more efficiently or more often than is possible as a result of manual input for improved execution of virtual infrastructure management services.

The application awareness system 110 may be implemented on one or more servers connected to a network used by an enterprise that operates one or more virtual entities. The network for example, may be an intranet of a large company. The application awareness system 110 may carry out various digital interactions, including discovering applications executing on each virtual entity and its configuration, with one or more entities that are part of virtual infrastructure 130 in order to provide data that may be used by the virtual infrastructure management system 150. Virtual entities in the infrastructure may have distributed applications installed on them. Virtual entities that run a distributed application may have various roles for the distributed application. The application awareness system 110 discover roles of virtual entities in distributed applications.

The of virtual infrastructure 130 may be made up of multiple physical computing devices networked together. Software, such as a hypervisor, executing on those physical resources may create virtual entities, such as virtual machines or containers. Each containers may have an operating system, which may be dedicated to the virtual entity, shared among multiple virtual entities or have parts that are shared among multiple virtual entities and parts that are dedicated to a single virtual entity.

The number and type of virtual entities, and the applications that execute on each, is not critical to the invention. Rather, the configuration of the virtual infrastructure may depend on the nature of the enterprise that is using virtual infrastructure 130. The virtual infrastructure may, for example, be multiple virtual servers that may collective implement business functions for the enterprise, such as e-mail, document storage and retrieval, order processing, payroll processing, or resource planning. Alternatively or additionally, the virtual entities may be single user entities, such as user desktops.

Regardless of the nature of the virtual entities and the applications they execute, the virtual infrastructure may be managed. In one embodiment, The virtual infrastructure management system 150 may manage and execute various services for virtual infrastructure 130. Digital interactions between the various systems may take place via the Internet or other network interface. Virtual infrastructure management system 150 may be a management system performing functions as is known in the art. It may be or include, for example, a utility that manages data protection services, such as back up. Such a system for example, may be configured to set a frequency at which data from a system is backed up or a quantity of resources, such as network bandwidth or storage is allocated for backup. These management functions may be performed for each of multiple virtual entities in the virtual infrastructure 130. Control of these management functions may be performed on a per-virtual entity basis. In accordance with some embodiments, virtual infrastructure management system 150 may be configured to apply rules, heuristics or other algorithms to determine, for each virtual entity, an allocation of resources or select a management function based on the identity of an application or applications executing on that virtual entity and/or the role of the application components executing on that virtual entity.

It should be appreciated that each of the systems illustrated in exemplary system 100 may engage in other types of digital interactions and activities in addition to, or instead of, those mentioned above, as aspects of the technology described herein are not limited to the analysis of any particular type of digital interactions. Also, digital interactions are not limited to interactions that are conducted via an Internet connection. For example, digital interactions may take place over wired connections.

In some embodiments, the application awareness system 110 may engage in different types of interactions with the virtual infrastructure 130. For instance, the application awareness system 110 may query entities of the virtual infrastructure 130 to discover applications executing on them. Furthermore, the application awareness system 110 may search entities within virtual infrastructure 130 for traces of applications installed on the entities. Additionally, the application awareness system 110 may access entities within virtual infrastructure 130 to determine configuration information about applications that may be installed on the entities. In some embodiments, the application awareness system 110 may access configuration information by transmitting program instructions to virtual entities and commanding execution of the program instructions.

In some embodiments, the application awareness system 110 may interact with the virtual infrastructure management system 150. The application awareness system 110 may provide information for the virtual infrastructure management system 150 to use in carrying out one or more services. Furthermore, the virtual infrastructure management system may request and retrieve information from the application awareness system 110.

In some embodiments, the virtual infrastructure management system 150 may carry out one or more services for the virtual infrastructure 130. The virtual infrastructure management system 150 may retrieve and send data from entities in the virtual infrastructure 130 and also send and receive commands to and from entities in the virtual infrastructure 130.

In some embodiments, the application awareness system 110 may comprise of a plurality of components. The system 110 may include an application awareness processor 112, an application discovery component 114, and one or more application probes 116, 118, 120, and application awareness data 122 that may be stored in database 124. The application awareness processor 112 may manage the app discovery component 114 and use it to carry out application discovery actions on one or more entities in virtual infrastructure 130. Furthermore, the application awareness processor may use the application probes 116, 118, 120 to gather information from entities in virtual infrastructure 130. The application awareness processor may gather information from the application discovery component 114 and from running probes 116, 118, 120, process the information, and store data 122 in database 124.

It should be appreciated that the components of the application awareness system 110 may reside on any one or multiple suitable computers or other devices. The devices may be collocated or distributed across multiple locations and communicate over a network interface. In other embodiments, the application awareness system 110 may reside on a single device. In some embodiments, application awareness system 110 may execute on a plurality of virtual entities.

In some embodiments, the application awareness processor 112 may be run by one or more processors executing a set of code stored in memory. The application awareness processor 112 may be configured to execute various system components including app discovery component 114 and application probes 116, 118, 120. The app discovery component 114 may be configured to carry out actions associated with interrogating and searching an entity to discover applications that may be installed on the entity. The application probes may be configured to carry out actions associated with interrogating and searching an entity to retrieve information about applications installed on the entity.

In some embodiments, the application awareness system 110 may access information that exists on virtual entities to discover installed applications on the virtual entities. Furthermore, the application awareness system 110 may access configuration information about applications discovered to be installed on the virtual entities. In some embodiments, the application awareness system 110 may operate in two stages: an application discovery stage and an application probing stage. The application awareness system 110 may, for example, execute the application discovery component 114 in the first stage during which the application discovery component 114 discovers applications that are installed on one or more virtual entities of virtual infrastructure 130. In the second stage, the application awareness system 110 may then execute one or more application probes (e.g. probes 116, 118, 120) to access configuration information about the installed applications from the virtual entity.

It is appreciated that the application discovery component 114 and application probes 116, 118, 120 can gather information without a need of special agents installed on the virtual entities or machines hosting the virtual entities. The application discovery component 114 and application probes 116, 118, 120 can execute processes without software or interfaces outside of those available with the standard operating system in order to interrogate and search the virtual entities for presence of applications. The application discovery component 114 and application probes 116, 118, 120 may cause a virtual entity to execute instructions through standard protocols.

In some embodiments, the application awareness system 110 may be configured to communicate with various operating systems (e.g. Windows, Linux, Unix, etc.) contained in or used by one or more of the virtual entities. In some embodiments, the application awareness system 110 may utilize standard protocols provided by the operating systems to establish an interface through which the application discovery component 114 and the application probes 116, 118, 120 can communicate with and control the virtual entities. The application awareness system 110 may utilize various protocols associated with various operating systems to establish an interface with a virtual entity and is not limited to any particular operating system or type of protocol described herein. Operating systems and protocols discussed herein are presented by way of example and not limitation. The application awareness system 110 may further be expanded to establish an interface with any number of operating systems with associated connection protocols.

In some embodiments, the application discovery component 114 may establish a control path with a virtual entity by executing a standard protocol associated with an operating system of the virtual entity. The application discovery component 114 and application probes 116, 118, 120 may then use the control path to communicate with the virtual entity. For example, the application awareness component 114 may execute a Windows Remote Management protocol to establish a control path with a virtual entity with a Windows operating system. In another example, the application discovery component 114 may execute an SSH protocol to establish a control path with a virtual entity with a Linux operation system.

In some embodiments, the application discovery component 114 may access information on a virtual entity to discover applications installed on the virtual entity. In some embodiments, the application discovery component 114 may query a registry of a virtual entity and determine whether one or more applications are installed on the virtual entity based on the response to the query. Additionally or alternatively, the application discovery component 114 may determine whether traces of an application that indicate that the application is installed exist on the virtual entity.

In some embodiments, the application discovery component 114 may directly communicate with a virtual entity over a control interface to query the virtual entity and/or determine presence of traces on the virtual entity. For example, the application discovery component 114 may communicate queries of an application registry of the virtual entity and receive information (e.g. attribute value pairs in response). The application discovery component 114 may then determine whether one or more applications are installed based on the query response. In another example, the application discovery 114 may communicate commands to search for a particular path to determine if an application is installed on the virtual entity. Additionally or alternatively, the application discovery component 114 may issue commands to retrieve a product code or other item that would exist if the application is installed on the virtual entity. The application discovery component 114 may use the responses to determine whether one or more applications are installed on the virtual entity.

In some embodiments, the application discovery component 114 may transmit program instructions to a virtual entity over an established control path or otherwise cause the virtual entity to access program instructions, such as by causing the virtual entity to download the program instructions from a server or other location. The application discovery component 114 may further send instructions to execute program instructions on the virtual entity. Additionally or alternatively, the application discovery component 114 may control the virtual entity and initiate execution of the transmitted program instructions.

For example, the application discovery component 114 may transmit various executable scripts (e.g. PowerShell scripts, Bash Shell scripts) to a virtual entity. The application discovery component 114 may then issue a remote command to cause the virtual entity to execute the scripts. The scripts, when executed by the virtual entity, may query a registry for information (e.g. attribute value pairs) associated with an application. Additionally or alternatively, the scripts, when executed, may gather information from configuration files associated with an application.

In another example, the application discovery component 114 may transmit scripts that, when executed, may search for a particular path to determine if an application is installed on the virtual entity. Additionally or alternatively, the scripts, when executed, may attempt to retrieve a product code or other item that would exist if the application is installed on the virtual entity.

In some embodiments, the application awareness processor 112 may run one or more application probes such as probes 116, 118, and 120 to collect configuration information about applications installed on a virtual entity. Each probe may be associated with a particular application and be configured to gather configuration information about the application.

In some embodiments, a probe may be configured to transmit a set of program instructions to a virtual entity over an established control path or otherwise cause the virtual entity to access program instructions, such as by causing the virtual entity to download the program instructions from a server or other location. The probe may further cause the virtual entity to execute the program instructions. The program instructions, when executed by the virtual entity, may cause the virtual entity to carry out actions and generate an output response that is retrieved by the probe and processed to extract application information. The probe may use the information to the information to determine a configuration of an application. For example, an application probe may transmit one or more executable scripts (e.g. PowerShell scripts, Bash Shell scripts) to a virtual entity. The probe may then issue a remote command to cause the virtual entity to execute the scripts. The scripts, when executed may carry out actions and produce responses. The probe may process the responses to determine a configuration of an application.

In one embodiment, the application discovery component 114 and application probes 116, 118, 120 may be further configured to remove traces of their operation from a virtual entity. The application discovery component 114 and application probes 116, 118, 120 may automatically clean, from the virtual entity, files and data produced and/or placed on the virtual entity during processes of application discovery and/or application probing. In some embodiments, the application discovery component 114 and application probes 116, 118, 120 may retrieve files and data generated during the application discovery and probing for further processing and then delete the files and data from the virtual entity.

In some embodiments, transmitted program instructions may include instructions to self-delete after execution. For example, the application discovery component or a probe may transmit a script(s) to a virtual entity and command the virtual entity to execute the script(s). As a result of executing the script(s), the virtual entity may produce files. Upon finishing execution of the script(s), the probe may command the virtual entity to delete the script(s) file(s) and any files produced or the script may contain code that causes the virtual entity to delete the script(s) and produced file(s).

In some embodiments, the application awareness processor 112 may process information collected from the virtual entities to generate application awareness data 122. The application awareness data 122 may comprise information about one or more entities. The information may include a listing of applications installed on an entity, configurations of applications installed on the entity, a role of the entity for a distributed application, and other information. The data 122 may be stored in a database 124. The database 124 may comprise a set of data stored in one or more computers or other devices. The database 124 may be accessed by a database API to read, write, modify, and delete data from the database.

Application information may be used in any suitable way. In some embodiments, the virtual infrastructure management system 150 includes an application data backup component 152. The application data backup component 152 may be configured to set policies for backing up data for applications installed on one or more virtual entities in virtual infrastructure 130. The application data backup component 152 may further access data from application awareness system 110 to use for setting data backup policies and executing data backup operations.

In some embodiments, the virtual infrastructure management system 150 includes an application data recovery component 154. The application data recovery component 154 may be configured to set policies for data recovery for applications installed on one or more virtual entities in virtual infrastructure 130. The application data recovery component 154 may be configured to access data from the application awareness system 110 to set recovery policies and execute data recovery operations. In one embodiment, the data recovery component 154 may utilize information indicating which applications are installed on a particular virtual entity to determine one or more application specific recovery policies for the virtual entity. For example, the data recovery component may have a plurality of backup policies for a plurality of applications or for a plurality of characteristics of applications, such as criticality or amount of data generated by an application. By gaining information of which applications are installed on a virtual entity, the data recovery component 154 may select a backup policies associated with applications installed on the virtual entity.

In some embodiments, the virtual infrastructure management system 150 may further include a resource allocation component 156 configured to allocate resources, such a compute time or memory, to virtual entities. The resource allocation component 156 may access data from the application awareness system 110 to set policies for resource allocation and execute resource allocation operations. In one embodiment, the resource allocation component 156 may have a priority of application importance. By utilizing knowledge of which applications are on which entities of virtual infrastructure 130, the resource allocation component 156 can set policies to provide more resources to virtual entities running applications of higher priority. In another embodiment, the resource allocation component 156 may assign resources according to a configuration of an application on a virtual entity. For example, the resource allocation component 156 may set policies to provide greater resources to a virtual entity acting as a primary server for an application than to a virtual entity acting as a secondary server for an application.

In some embodiments, the virtual infrastructure management system 150 may include monitoring services as part of one or more of the components or as a separate component. The system 150 may provide users 160 live metrics and statistics about virtual entities installed in virtual infrastructure 130. The metrics and statistics may be discovered on one or more devices 162 to the users. The system 150 may, for example, provide a visual display showing computation resources being used by one or more of the virtual entities. Additionally or alternatively, the system may provide a visual display of applications installed on one or more of the visual entities. In some embodiments, the monitoring services may access application awareness data specifying roles of virtual entities for one or more distributed applications installed on the virtual entities. The monitoring services may then display virtual entities with their corresponding roles and resource usage.

It should be appreciated that the virtual infrastructure management system may include other components to execute other services 158 for the virtual infrastructure 130. Embodiments are not limited to the services illustrated in exemplary system 100. Further, the components of the virtual infrastructure management system 150 may be implemented on one or more separate machines. Any or all of the components may be implemented across multiple machines in a distributed fashion and/or in various combinations, including network-distributed (e.g., client-server) implementations.

Figure 2:
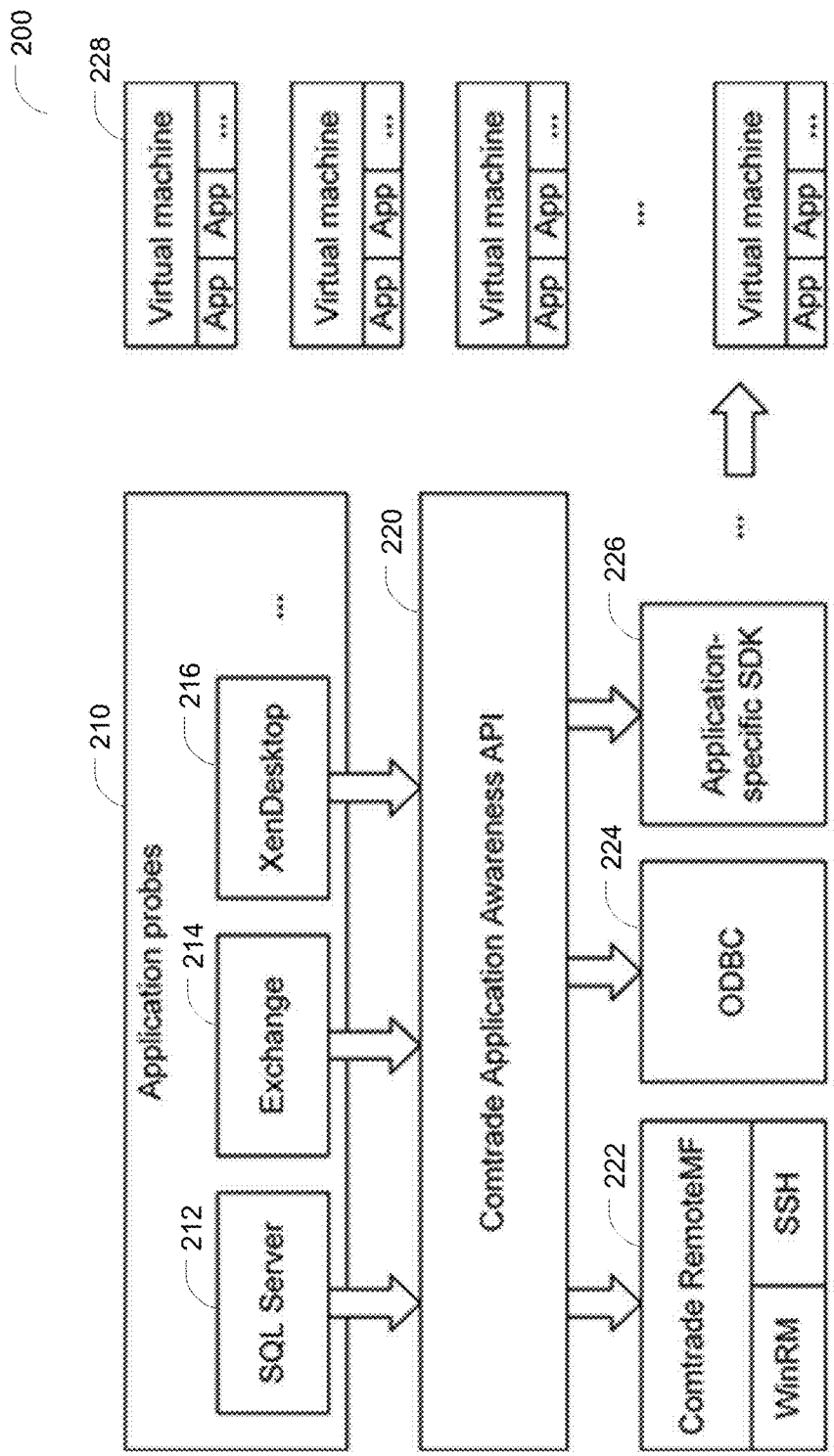
FIG. 2 is a block diagram of an illustrative system 200 showing digital interactions that may take place between elements of the system, in accordance with some embodiments described herein.

FIG. 2 illustrates an example embodiment of an application awareness system interacting with one or more virtual machines 228. The illustrated system may comprise application awareness system 110 with reference to FIG. 1.

In some embodiments, the system (e.g. system 110) may comprise a set of application probes 210. The set of application probes may include a probe for each application. The system may further include an application program interface 220 to access probes and to run probes. The probes may use multiple interfaces to collect information from the virtual entities such as remote access 222, open database connectivity (ODBC) 224, application specific software development kits (SDK) 226, and other interfaces.

In some embodiments, the application awareness processor 112 may access application probes 210. The application probes 210 may comprise a separate application probe for each application. For example, the application awareness system (110) may include an SQL Server probe 212, a Microsoft Exchange probe 214, a XenDesktop probe 216, as well as probes for other applications. Each probe may transmit a specialized program instructions to a virtual entity that, when executed by a virtual entity, is configured to cause the virtual entity to carry out actions to generate information about the application associated with the probe. In another example, a probe may control execution of a set of database query operations that may be executed to retrieve information for a respective application.

In some embodiments, the application awareness system (e.g. system 110) may include an application program interface (API) 220. The API 220 may provide an interface by which the system may probe various virtual entities. The API 220 may include code that can access application probes. In one embodiment, the API 220 may include code to access individual application probes to gather information about a particular application. The code may call an application probe to execute processes associated with gathering information for an application associated with the application probe. For example, the API 220 may receive a set of installed applications (e.g. from the application discovery component 114). The API 220 may then call application probes associated with the installed applications to gather information about the installed applications.

In some embodiments, the API (e.g. API 220) may include a remote management framework 222 to transmit program instructions and control remote execution of the program instructions. The remote management framework 222 may allow probes of the application awareness system (e.g. system 110) to transmit program instructions (e.g. scripts) and command execution of the program instructions. The scripts may cause the virtual entity to perform actions to generate information about a respective application. The scripts may, for example, comprise PowerShell and/or Bash Shell scripts that are executed using services such as Windows Remote Management (WinRM) or a secure shell (SSH). WinRM may allow the application awareness system to remotely connect to a virtual entity and then command a virtual entity to execute scripts. SSH may allow the application awareness system to gain remote access to the virtual entity and use the remote access to command execution of one or more application probe scripts.

In one embodiment, an application probe may access an ODBC interface 224. The ODBC interface 224 provides a standard way of accessing a variety of database management systems. An application probe may, for example, transmit a set of instructions that may be executed by the virtual entity using the ODBC interface 224 to access various databases. The instructions may comprise various query operations, for example, to retrieve information from a database about a respective application.

In another embodiment, the an application probe may access one or more application specific software development kits (SDK) 226 which can be used to access information from specific applications. An SDK may provide a standard by which a particular operation system or application may be accessed. For example, a Java SDK for an operating system executing on a virtual entity may allow the application awareness system to access information about an application using programmed instructions coded in Java. Application probes may transmit program instructions that cause the virtual entity to utilize SDKs to access specific application information.

Figure 3:
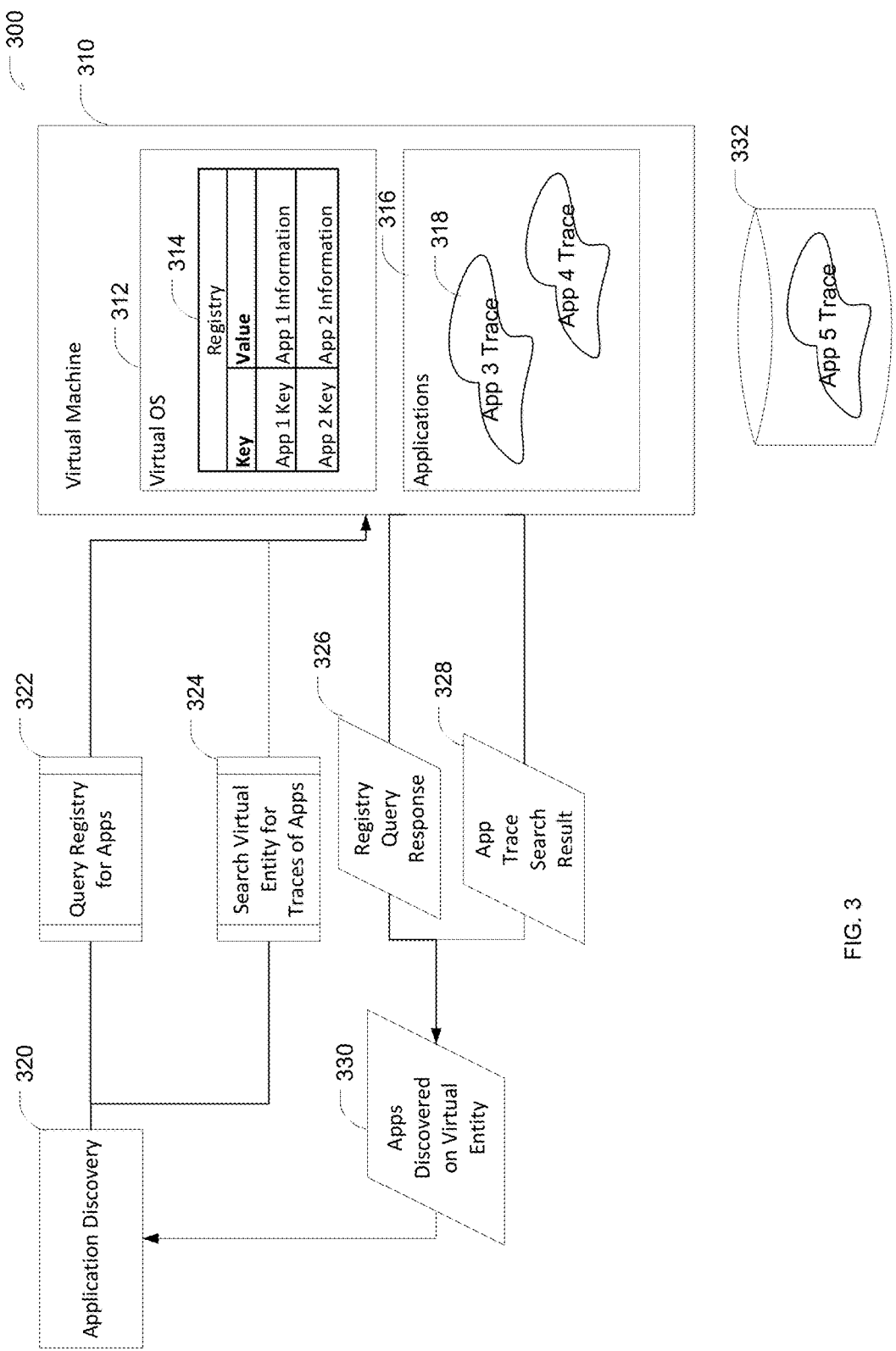
FIG. 3 data flow diagram 300, illustrating data flow during application discovery performed by an exemplary application awareness system, in accordance with some embodiments described herein.

FIG. 3 illustrates an exemplary system data flow 300 through which the application awareness discovery system 320 may find which applications are installed on a virtual entity 310. The application awareness system 320 shown in FIG. 3 may be an embodiment of the exemplary application awareness system 110 shown in FIG. 1.

In some embodiments, the application discovery component 320 may establish a communication interface with an operating system executing on a virtual entity 310. The application discovery component 320 may execute a standard protocol available for the operating system to create an interface over which the application discovery component 320 can access information on the virtual entity 310 such as by querying and searching the virtual entity 310. In the case of a Windows operating system, for example, the application discovery component 320 may remotely connect using a protocol for Windows such as Windows Remote Management. In one embodiment, the application discovery component 320 may then transmit and command execution of program instructions that, when executed by the virtual entity, carry out actions for various processes associated with application discovery.

For a Linux operating system, the application discovery component 320 may utilize a protocol available with Linux, such as SSH. The application discovery component 320 may establish an SSH interface and use it to transmit and command execution of program instructions associated with various application discovery processes. In another embodiment, the application discovery component 320 may remotely execute commands in order to cause the virtual entity 310 to carry out actions. The application discovery component 320 may use responses to the actions to discover presence of applications.

The application discovery component 320 is not limited to any particular operating system. The application discovery component 320 may use any standard protocol available with an operating system of a virtual entity. The application discovery component 320 does not require additional software installed or availability of additional interfaces in order to execute application discovery processes.

In some embodiments, the application awareness discovery system 320 may execute multiple processes to discover which applications from a set of applications are installed on a virtual entity (e.g. virtual entity 310). One process that the system 320 may execute is process 322, where the system 320 queries the virtual entity 310 to determine whether one or more applications are installed on the machine. Another process that the system 320 may execute is process 324, where the system 320 searches the virtual entity 310 for traces of one or more applications. The application awareness system 320 may then use the responses 326 from the query process 322 and the results 328 from the application trace search process to get a set of apps 330 discovered on the virtual entity 310. All applications that are searched for may not be present on the virtual entity such as app 5 332. In illustrated example 300, the set of discovered applications would not include app 5 because it has no detectable presence in the virtual entity 310.

In some embodiments, a virtual entity 310 may include an operating system (OS) 312 and applications 316 that are installed on the virtual entity. The OS 312 may include a data store of information about applications, such as a registry of applications that are installed on the virtual entity. The virtual entity 310 may have several applications installed on the virtual entity 310.

However, the data In some embodiments, applications may have traces such as trace 318 on the virtual entity. Traces of an application may include information stored on or in connection with the virtual entity that indicates presence of that application on the virtual entity. For example, if a virtual entity has a particular application installed (e.g. SQL Server, Microsoft Exchange, etc.), the virtual entity may have particular files, folders, and file types that are associated with the application. These files, and therefore the associated applications, may be identified for example, by the names of these files, extensions of these files, locations of these filed, the data contained in these files or metadata associated with these files.

In some embodiments, the registry 314 may comprise a dataset of information about applications that are installed on the virtual entity (e.g. virtual entity 310) The registry 314, as discussed above, may comprise a database that stores settings for applications installed on the virtual entity 310. In one example, the virtual entity 310 may be installed on a Windows OS. The registry 314 in this case may comprise the Windows registry which comprises a hierarchical database that stores low-level settings for applications installed on the virtual entity 310. In another example, the virtual entity may be running a Linux OS. In this case, the virtual entity may have a registry that includes several directories which include information about installed applications.

In some embodiments, the virtual entity 310 may additionally have traces of applications that are installed on the virtual entity 310. A trace of an application may comprise a sign that the respective application is present on the virtual entity 310. In one example, a trace may include specific file extensions, file formats, code, system logs, or other items that indicate that a respective application is installed on virtual entity 310. The application discovery component 320 may transmit program instructions to the virtual entity that, when executed, search for presence of traces of an application on the virtual entity 310 in order to determine if the application is installed on the virtual entity 310. The traces may form a data set, containing information of any suitable type that is stored on a virtual entity when an application is installed on or executes on a virtual entity.

It should be appreciated that the example shown in FIG. 3 and described above is provided solely for purposes of illustration. Aspects of the technology described herein are not limited to only the illustrated processes of application discovery. Further, the application awareness system may search for any number of applications.

Figure 4:
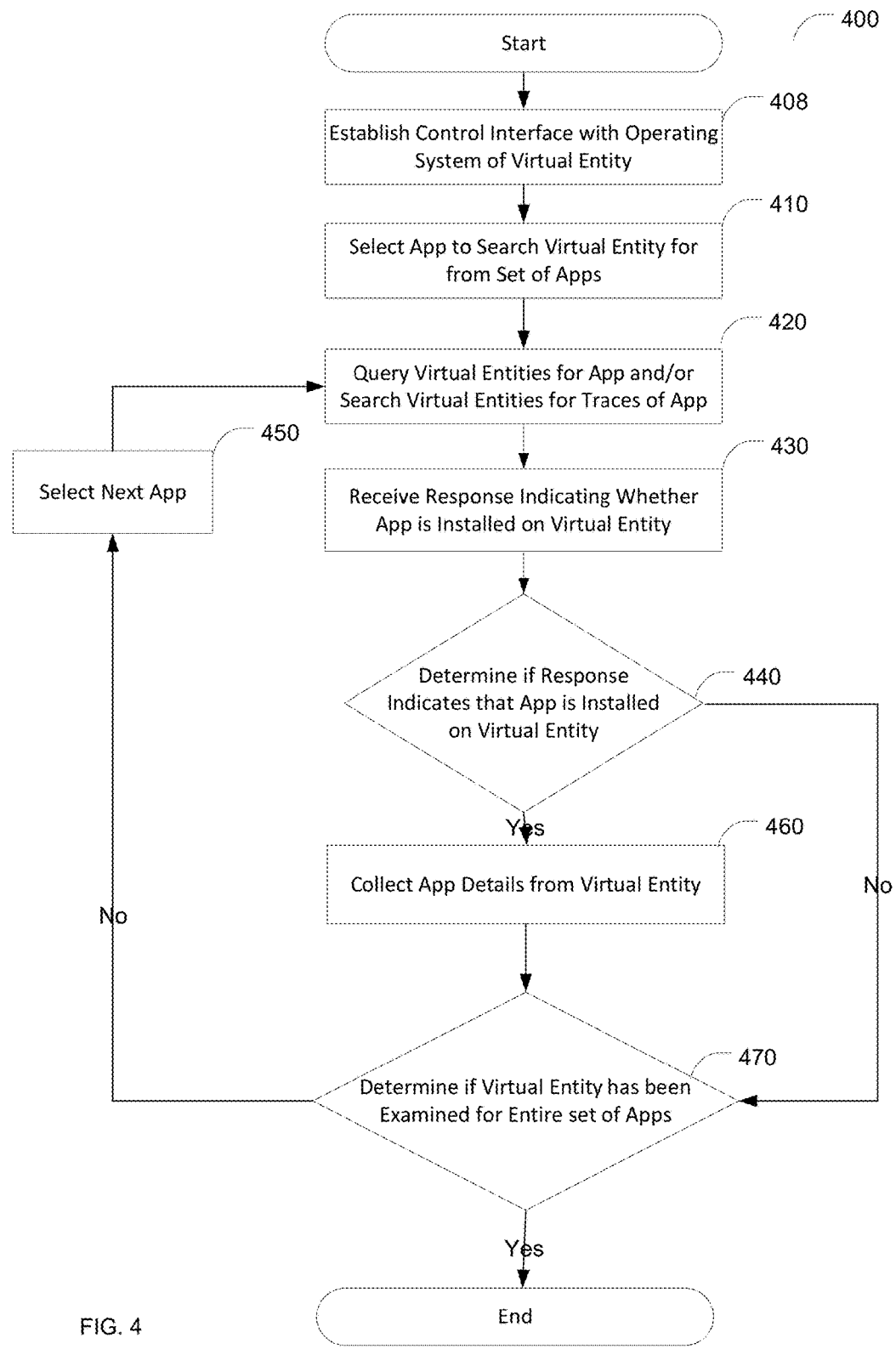
FIG. 4 is a flow chart of an exemplary process 400 performed as part of a technique for discovering which applications are installed on a virtual entity in accordance with some embodiments described herein.

FIG. 4 is a flowchart of exemplary process 400 for discovering which applications from a set of applications are installed on a virtual entity. The process 400 may be performed by any suitable system and/or computing device and, for example, may be performed by application awareness system 110 described with reference to FIG. 1.

Process 400 begins at act 408, where the application awareness system executing process 400 (e.g. application awareness system 110) establishes a control interface with a virtual entity. In one embodiment, the application awareness system may identify a specific virtual entity according to a unique ID associated with the virtual entity. For example, the application awareness system may identify and connect to a virtual entity over a network interface using an IP address of the virtual entity. The system may discover all the unique IP addresses in a virtual infrastructure. Additionally or alternatively, the system may receive a list of virtual entity IDs (e.g. IP addresses) in a virtual infrastructure.

The system may execute a standard protocol available with an operating system of the virtual entity (e.g. Windows Remote Management, SSH, etc.) in order to establish a control interface with the operating system of the virtual entity as discussed above. The application awareness system may then select an application from a set of applications for which to search a virtual entity. The application awareness system may maintain one or more sets of applications. A set of applications may be specified and modified by a user. The application awareness system may be capable of determining whether each application in the set of application is installed on a virtual entity. The application awareness system allows can be expanded to be able to determine a presence of any number of applications.

Next, process 400 proceeds to act 410 where the application awareness system executing process 400 may select an app in response to a command to execute application discovery on a virtual entity or in response to an event. The application awareness system may store the one or more sets of applications in a suitable database and access the one or more sets for application discovery. It is further appreciated that in some embodiments the application awareness system may query a plurality of virtual entities concurrently to collect information about a selected Application. This may allow the application awareness system to efficiently gather information about many entities of a virtual infrastructure. Exemplary process 400 illustrates a set of steps that may be executed for one of the plurality of virtual entities.

Next, process 400 proceeds to act 420, where the system executing process 400 queries the virtual entity and searches the virtual entity for traces of the selected application to determine if the selected application is installed on the virtual entity. If the virtual entity is a virtual machine, the application awareness system may submit a query to a registry in the OS of the virtual machine asking if the application is registered in the registry. For example, if the virtual machine is running a Windows OS, the application awareness system may generate and submit a query to the Windows registry to determine if an entry exists for the selected application. The Windows registry query may include one or more keys that may exist in the registry if the selected application is installed on the virtual entity. In another example, if the virtual machine is running a Linux OS, the system may search directories for configuration files associated with installed applications.

In some embodiments, the application awareness system may transmit program instructions that, when executed by the virtual entity, cause the virtual entity to carry out query and/or search operations. The program instructions, when executed by the virtual entity, may query a registry of the virtual entity to determine if the selected application is installed. For example, if the virtual entity is a virtual machine running Windows OS, the program instructions may cause the virtual entity to generate and submit a query to the Windows registry to determine if an entry exists for the selected application. In another example, if the virtual entity is running a Linux OS, the program instructions, when executed, may search directories of configuration files associated with installed applications. The application awareness system may retrieve responses from execution of the program instructions and process them to determine presence of the selected application.

In some embodiments, the application awareness system may include a stored set of query searches to use for a given application. When an application is selected for discovery on a virtual entity, the system may access a corresponding query search that is specific to the selected application. Application queries may be defined, for example, when a new application is added to the application awareness system for discovery.

In some embodiments, the application awareness system may include stored sets of program instructions to use for a given application. When an application is selected for discovery on a virtual entity, the application awareness system may access a corresponding set of program instructions that, when executed by the virtual entity, query and search for presence of the selected application. Program instructions may be defined, for example, when a new application is added to the application awareness system for discovery.

The system may further search for traces of the selected application. The system may search for indications that the application is present on the system. The system may, for example, search for particular file types on the virtual entity that are associated with the application. The system may further search logs for traces of the application. In one embodiment, the system may search certain folders for presence of certain files.

In some embodiments, the application awareness system may search different parts of the virtual entity and access various applications and files in the virtual entity. In one embodiment, the system may attempt execution of certain commands on the virtual entity. Based on a response to those commands, the system may determine if traces of the application are present on the virtual entity.

In some embodiments, the application awareness system may transmit program instructions to the virtual entity that, when executed by the virtual entity, search for traces of the selected application. The virtual entity may search for particular file types, logs, and/or folders for presence of the selected application. The virtual entity, when executing the program instructions, may further attempt execution of certain commands.

As discussed above with respect to some embodiments, the application awareness system may cause a virtual entity to execute a set of transmitted program instructions (e.g. executable script files). In one embodiment, the system may transmit the program instructions to the virtual entity and command the virtual entity to execute them in order to execute querying and searching processes. The application awareness system may, for example, transfer scripts as payload text over an established interface (e.g. Windows Remote Management, SSH, etc.). In other embodiments, the system may further transfer program instructions (e.g. scripts) that, when executed by the virtual entity, direct the virtual entity to download additional program instructions (e.g. additional scripts) and/or other program modules from a server (e.g. via HTTP, HTTPS, etc.). The system may additionally provide additional input files from the server for use on the virtual entity to execute search and query processes.

Next, the process 400 proceeds to act 430, where the application awareness system receives a response to the query and search. The system may receive a list of items in response to the query. For example, if the system submitted a windows registry query, the response may comprise a list of sub keys that exist within the submitted query key. In another example scenario, the response may return no sub keys. The system may alternatively or additionally receive other information after managing processes of searching for traces of the selected application. The information may comprise data indicating presence of the application on the virtual entity such as specific file types, existence of folders, or other data.

In some embodiments, the application awareness system may receive a response as a result of the virtual entity executing a set of transmitted program instructions. The virtual entity, when executing the program instructions, may generate response information. The response information may comprise files, text in a terminal, or other information. In one embodiment, the application awareness system may command the virtual entity to transmit the information to the application awareness system via the control interface. Additionally or alternatively, the transmitted program instructions may cause the virtual entity to automatically transmit the information to the application awareness system via the control interface. In some embodiments, the program instructions may, when executed by the virtual entity, cause the virtual entity to upload information to designated locations (e.g. web servers, databases, etc.).

After receiving a response to the query and search, the process 400 proceeds to act 440, where the application system executing the process determines if the received query and/or search response indicates that the application is installed on the virtual entity. The system may process the response to determine if items indicating presence of the application are included in the response. For example, if the system received a response from a Windows registry query, the system may check for specific sub keys in the response that indicate presence of the application. The system may have a stored set of sub keys for the application that are known to indicate presence of the application on a virtual entity. If the system finds that one or more of the items indicating presence of the application are present in the response, it may determine that the application is present on the virtual entity and proceed to act 460 to collect further details about the application installed on the virtual entity.

In some embodiments, the application awareness system may attempt multiple methods of searching for presence of an application to make a determination of whether the application is installed on the virtual entity. If the application awareness system determines that all methods return results indicating that the application is not present, the process may proceed to act 470 where the system determines if the virtual entity has been examined for the entire set of applications. For example, if a query or search response does not contain items indicating presence of the application, the process may proceed to act 470.

At act 470 of exemplary process 400, the system determines whether the virtual entity has been searched for all the applications in the set of applications. If the system has not searched for all the applications in the set of applications, the system may proceed to act 450, where the system selects another application from the set of applications. If all applications from the set of applications have been processed, the process may end.

In some embodiments, exemplary process 400 may be executed by the application awareness system for a plurality of virtual entities in a virtual infrastructure. The process 400 may be executed in parallel for the plurality of virtual entities or serially.

Figure 5:
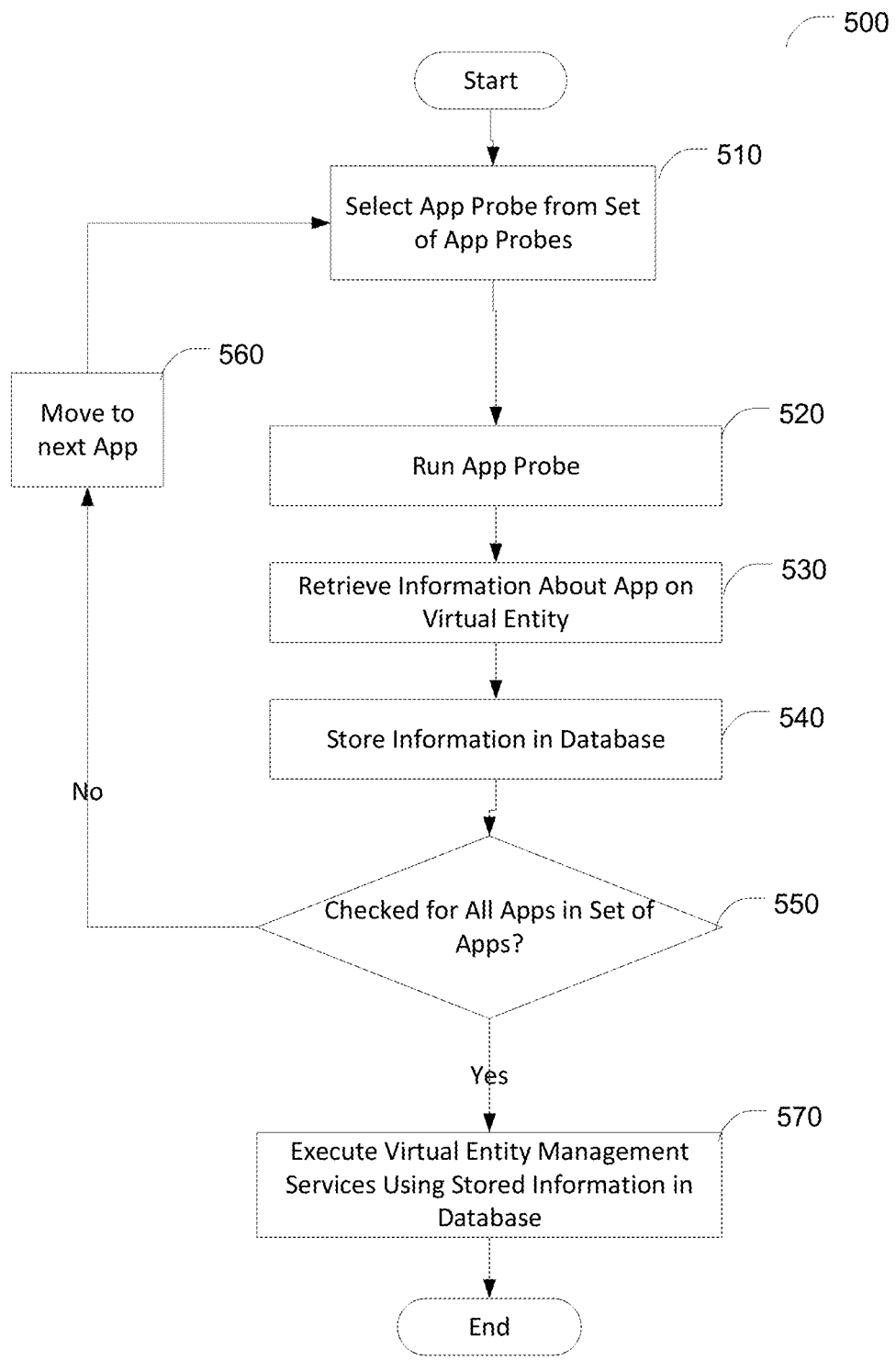
FIG. 5 is a flow chart of an exemplary process 500 performed as part of a technique to access information about an application installed on an entity in accordance with some embodiments described herein.

FIG. 5 is a flowchart of exemplary process 500 for accessing information about one or more applications installed on a virtual entity. The process 500 may be performed by any suitable system and/or computing device and, for example, may be performed by application awareness system 110 described with reference to FIG. 1.

Process 500 begins at act 510, where the application awareness system executing process 500 (e.g. application awareness system 110) selects an application probe for an application from a set of applications discovered to be installed on the virtual entity. The application awareness system may have previously identified the set of applications installed on the virtual entity. In some embodiments, the application awareness system may have executed a process such as exemplary process 400 to discover the set of applications installed on the virtual entity. The system may, for example, execute exemplary process 500 in order to collect more details about an application discovered to be installed on the virtual entity.

Next, process 500 proceeds to act 520, where the application awareness system runs an application probe(s) for the selected application. The system may use one or more suitable interfaces, such as the interfaces discussed above in reference to FIG. 2, through which a probe may interrogate the virtual entity. In some embodiments, the application probe(s) may utilize standard interfaces to access application information. In other embodiments, the application probe(s) may use application specific interfaces to access application information.

In one embodiment, the application probe may cause the virtual entity to carry out various actions and process results of the actions to retrieve application information. The running of the application probe may comprise gaining remote access of the virtual entity and executing one or more set of program instructions remotely. The system may, for example, use Windows remote access to execute scripts on the virtual entity if it is running a Windows operating system. In another example, the system may use SSH to execute one or more scripts. The scripts may comprise, for example, Power Shell or Bash scripts.

In some embodiments, the application probe may transfer a set of executable program instructions which may then be executed on the virtual entity. For example, the system may transfer a set of scripts and/or program modules (e.g. executable files) to execute on the virtual entity. The system may transfer scripts or program modules as payload text over an established interface (e.g. Windows Remote Management, SSH, etc.). In other embodiments, the system may direct the virtual entity to download scripts and/or program modules from a server (e.g. via HTTP, HTTPS, etc.). The system may provide additional input files from the server for use on the virtual entity to execute probing processes.

Alternatively or additionally, the probe(s) may query one or more databases of the virtual machine using ODBC to collect information about the application. The probe may submit requests to retrieve data related to the application from various fields of a dataset. In one example, the queries may comprise database queries to retrieve data from fields of a database. In some embodiments, the probe(s) may transfer program instructions that, when executed by the virtual entity, cause the virtual entity to query databases in order to gather information about the application.

In yet another embodiment, the probe(s) may use an application specific software development kit (SDK) to execute programmed actions on the virtual entity. A probe may manage execution of a set of programmed instructions using the SDK. In one embodiment, the probe(s) may transfer program instructions that, when executed by the virtual entity, cause the virtual entity to access application information using the SDK.

The system probe(s) may retrieve information specifying a particular topology or structure of virtual entities on which a distributed application is installed. Additionally and/or alternatively, the probe(s) may determine a list of virtual entities on which the application is running, identifiers of the virtual entities, a role configuration of the application, and other configuration information. In some embodiments, the probe(s) may obtain information about an application's configuration from one virtual entity. In other embodiments, the probe(s) may obtain information about an application's configuration from a plurality of different entities.

Figure 15A:
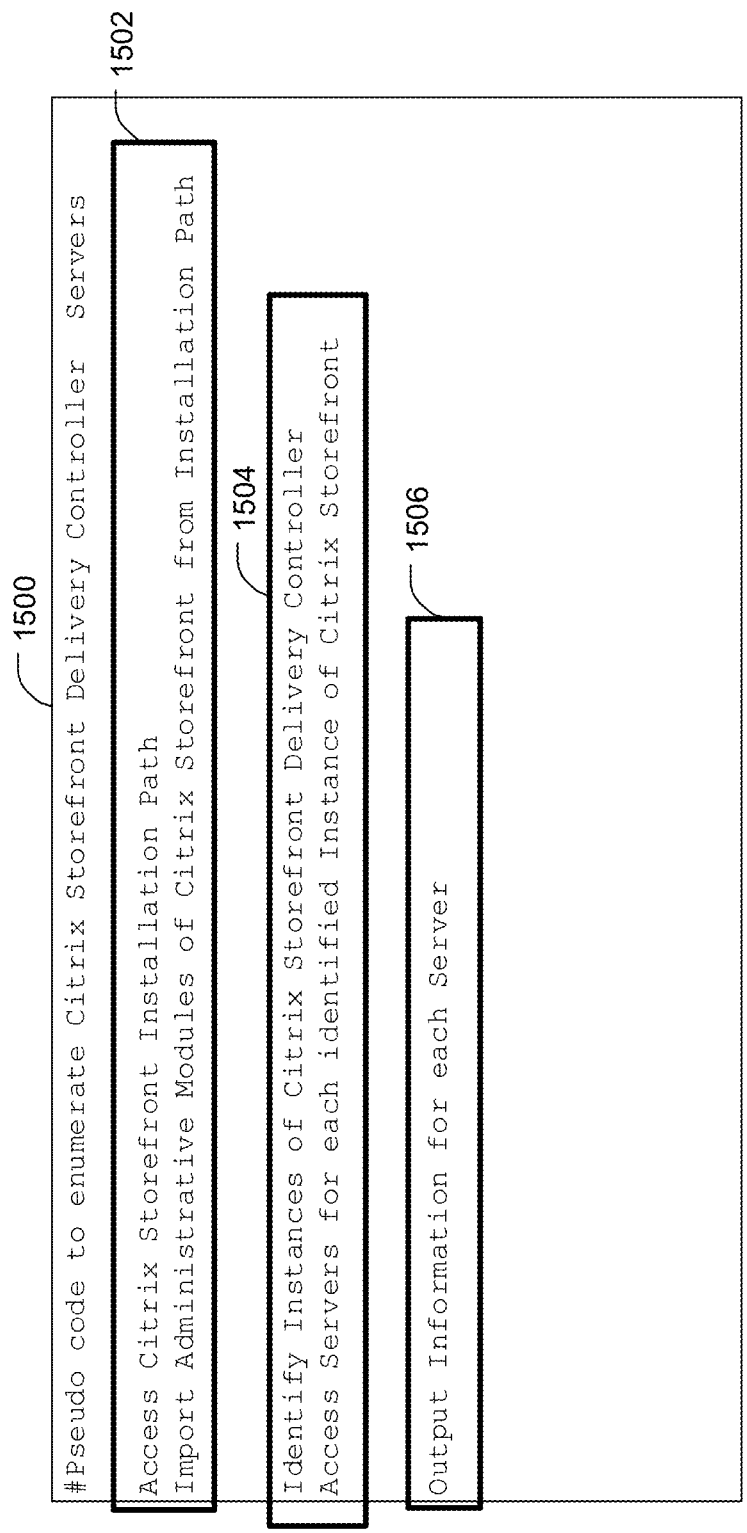
Figure 15C:
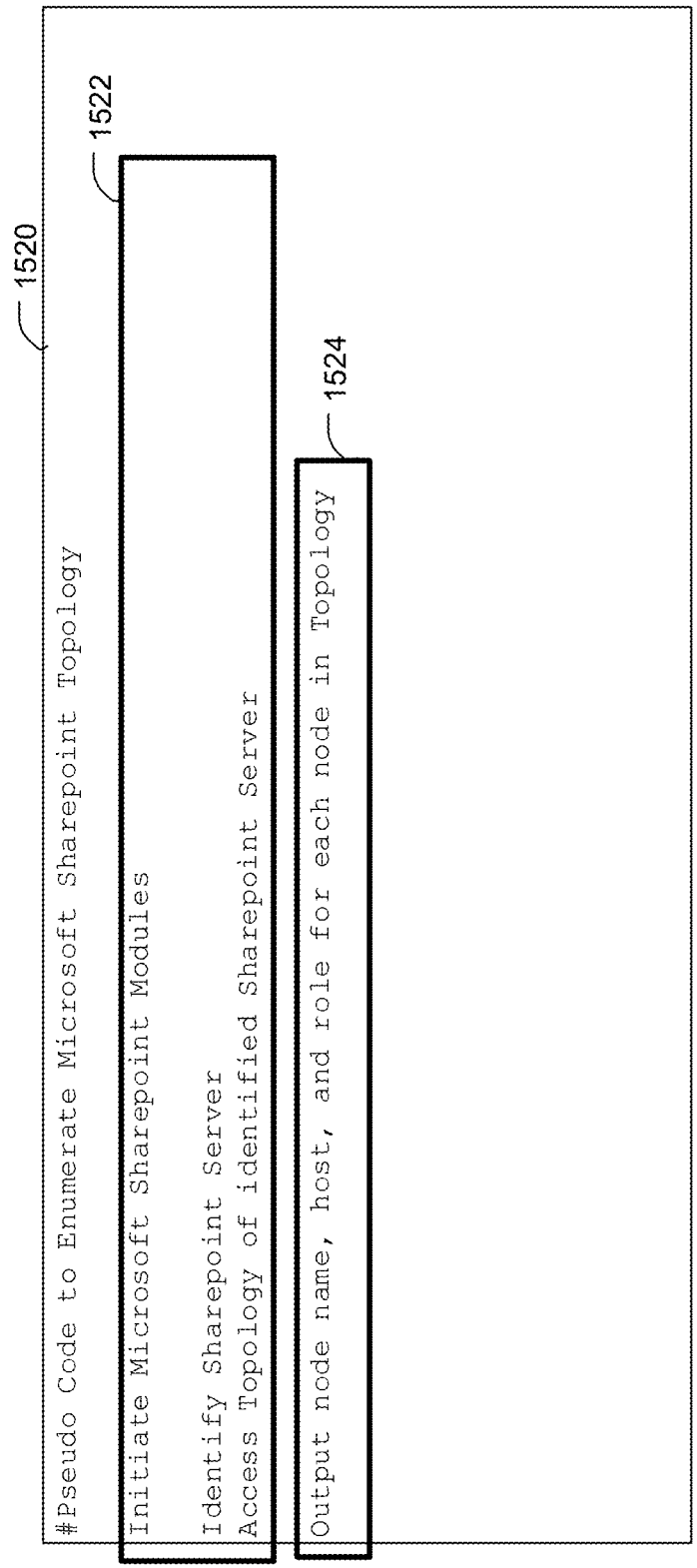

FIGS. 15A-15C illustrate sets of pseudo code of program instructions which may be transferred to a virtual entity by various application probes according to some embodiments described herein. Each set of pseudo code may be implemented in any suitable programming language (e.g. Power-Shell or Bash) using programming techniques as are known in the art. The example program instructions may be executed by the virtual entity as part of process 500.

FIG. 15A illustrates example pseudo code 1500 of program instructions that may be used by an application probe(s) to query information about Citrix applications installed on a virtual entity. The application probe(s) may, for example, transfer the program instructions to the virtual entity and command the virtual entity to execute the program instructions. Program instructions 1502, when executed by the virtual entity, cause the virtual entity to gain access to various administrative modules of an application such as Citrix Storefront. The modules may include additional functions that may be called when executed by the virtual entity in order to retrieve information about Citrix applications. Program instructions 1504 may, when executed by the virtual entity, cause the virtual entity to retrieve information about virtual entities that are serving a specified role (e.g. delivery controller) for the Citrix application. For example, the virtual entity may retrieve a list of delivery controllers and corresponding host servers of the delivery controllers for each instance of the Citrix Store Front application. Program instructions 1506, when executed by the virtual entity, cause the virtual entity to retrieve and output a list of delivery controller virtual entities on which an instance of the Citrix Store Front Application is running. The probe(s) may then retrieve this information for storing and additional processing.

FIG. 15B illustrates example pseudo code 1510 of program instructions that an application probe may transfer to a virtual entity and command the virtual entity to execute in order to retrieve additional information about the Citrix XenDesktop application installed on one or more virtual entities. Program instructions 1510, when executed by the virtual entity, may cause the virtual entity to retrieve a list of virtual entities that serve in the "machine" role for the application. The pseudo code may further include program instructions 1512 that, when executed, may cause the virtual entity to output a DNS name (e.g. IP address) of the one or more virtual entities and a session support value. The session support value may specify the number of sessions the application can support (e.g. single or multiple). A probe may retrieve the outputted information for storing and additional processing.

FIG. 15C illustrates exemplary pseudo code 1520 of program instructions that an application probe(s) may transfer to a virtual entity and command the virtual entity to execute in order to retrieve information about the Microsoft SharePoint application installed on one or more virtual entities. Program instructions 1522, when executed by the virtual entity, cause the virtual entity to retrieve a record of virtual entities on which Microsoft SharePoint is installed. Program instructions 1522, when executed, further cause the virtual entity to retrieve a host and a role of each virtual entity for the Microsoft SharePoint installation. The pseudo code 1520 may further include program instructions 1524 that cause the virtual entity to output the acquired information which includes the virtual entities along with their corresponding hosts and roles. A probe may retrieve the outputted information for storing and additional processing.

A probe for an application may execute one of the methods discussed above or a combination of more than one of the probe methods mentioned herein. Embodiments are not limited to any specific type of probes or combination of methods or interfaces to form the probes.

Next, exemplary process 500 proceeds to act 530, where the system retrieves information about the application installed on the virtual entity as a result of running the application probe. The information may comprise output results from execution of script(s), data retrieved from querying one or more databases, information received from executing programmed actions, or other information received as a result of running the probe.

FIG. 7 illustrates examples of information that can be received by the application awareness system in response to running application probes. In some embodiments, the application probe may retrieve information from a virtual entity. The application probe may, for example, transfer program instructions to the virtual entity that, when executed by the virtual entity, cause the virtual entity to transfer the information to the application awareness system. The virtual entity may transfer files to the application probe.

Additionally or alternatively, the program instructions may cause the virtual entity to upload information to a location that may then be accessed by the application awareness system to download the information. For example, the virtual entity may, by executing program instructions received from the application probe, upload files containing application information to a web server. The application awareness system may then access the web server to retrieve the files.

Information 710, for example, illustrates an output of a script that is configured to generate information about SQL Server installed on the virtual entity. The information 710 includes details about the application such as the full application name 712, a name of the server running the application 716, and a type for the application 714. The information 710 indicates a configuration of the application for the virtual entity of interest.

Information 720 of FIG. 7 is information generated from execution, by a virtual entity, of a script configured to probe the virtual entity for information about the XenDesktop application. Information 720 comprises an application name 722 as well as information about the topology of the distributed application such as host names 724 and roles 726.

Next, exemplary process 500 proceeds to act 540, where the application awareness system stores the retrieved information in a dataset. The system may, for example, store it in database 124 described in reference to FIG. 1. The application awareness system may process the received information to extract specific information about the application configuration on the virtual entity. The application awareness system may then proceed to store the information in a database. The application awareness system may, for example, write data encoding the information in one or more fields of the database. The application awareness system may further process information gathered from individual probes and then store them in the dataset.

Next, process 500 proceeds to act 550, where the application awareness system determines if it has exhausted the probing process for all applications of interest that were discovered to be installed on the virtual entity. If the application awareness system determines that there are applications remaining which have not been probed for 550 No, the system proceeds to act 560 where it selects the next application in the set and returns to act 520. If the system otherwise determines that probes have been run for all the applications of interest, the process may proceed to act 570.

At act 570, a virtual infrastructure management system (e.g. system 150) may utilize the stored data to execute virtual infrastructure management services. The system may execute application data backup, application data recovery, resource allocation, and other services as discussed above with reference to FIG. 1.

Figure 6:
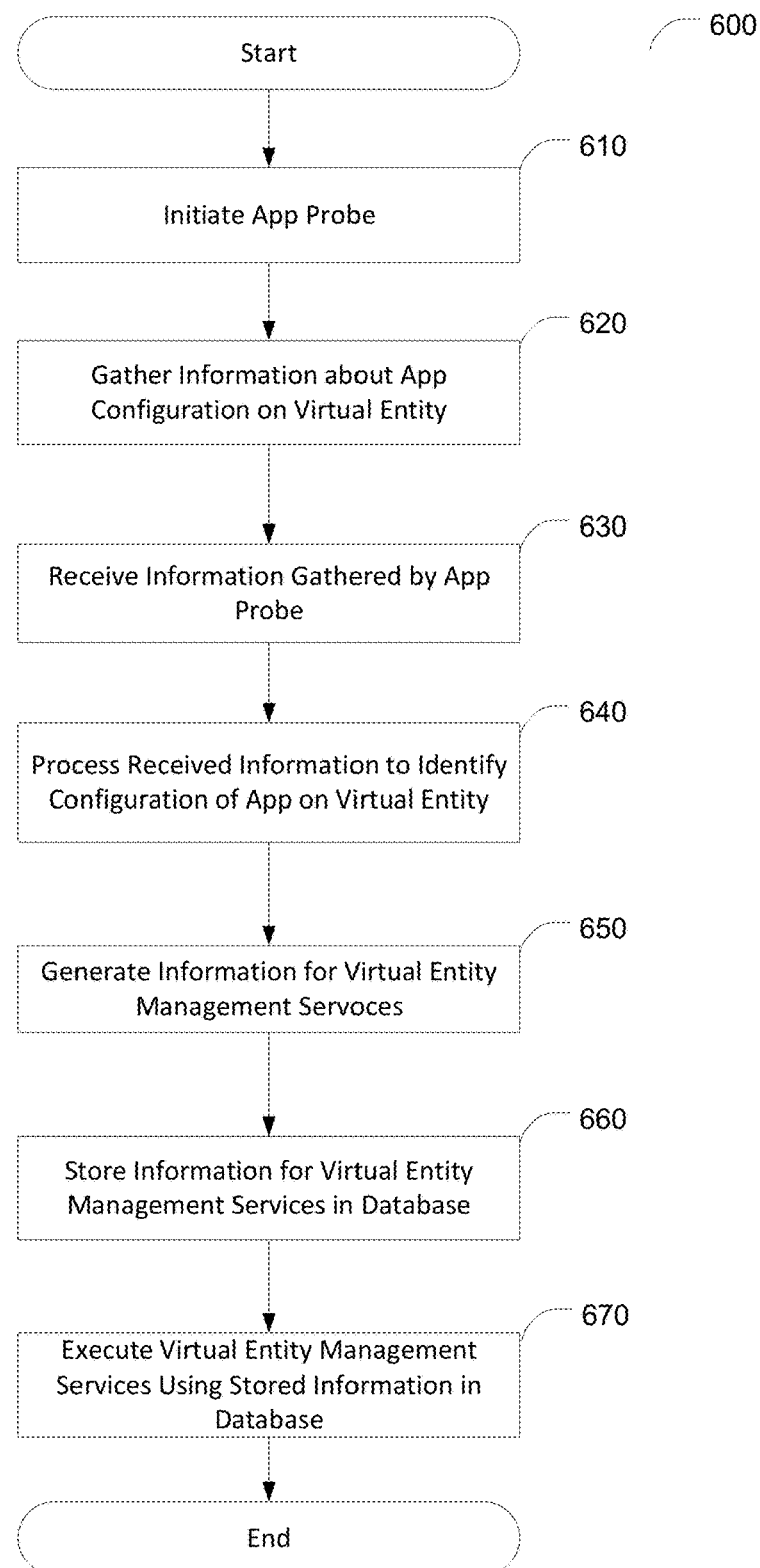
FIG. 6 is a flow chart of an exemplary process 600 to collect, process, and store information about an application installed on an entity for use in virtual infrastructure management services in accordance with some embodiments described herein.

FIG. 6 illustrates an exemplary process 600 by which information about an application installed on a virtual entity may be collected, processed, and stored for use in virtual infrastructure management activities. The process 600 may be executed by a suitable system such as system 110 discussed above with reference to FIG. 1. The application awareness system 110 may, for example, have discovered that the application was installed on the virtual entity (e.g. during processes 300 and/or 400).

Process 600 begins with acts 610, 620, and 630, where the application awareness system initiates an application probe, gathers information from the virtual entity by running the probe, and receives information gathered as a result of running the probe. These processes may be executed in a manner illustrated by exemplary process 500 discussed above.

Next, the process 600 proceeds to act 640, where the application awareness system processes received information to identify a configuration of the application on the virtual entity. The application awareness system may analyze the received information to determine various configuration details about the application installed on the virtual machine. Configuration details may include a role of the virtual machine for the application, an application version, a host of the application, details about the host of the application, and other configuration information.

In some embodiments, the application may comprise a distributed application that is distributed across a plurality of virtual entities. In this case, the application awareness system may process the received information to identify a role of the virtual entity in the distributed application. The virtual entity may, for example, be a secondary storage node of a distributed SQL Server application. Furthermore, the application awareness system may be able to determine an overall topology of the distributed application from the information. The overall topology may, for example, comprise a specification of virtual entities that the application is distributed across and a role of each virtual entity.

Next, exemplary process 600 proceeds to act 650, where the application awareness system generates information that may be used for virtual infrastructure management services. The application awareness system may set certain parameters associated with each virtual entity to provide the virtual infrastructure management system with valuable details for its operations. The application awareness system may, for example, specify a role of the virtual entity in one or more distributed applications installed on the virtual entity.

Next, exemplary process 600 proceeds to act 660, where the application awareness system stores the generated information in a dataset (e.g. database 124). The application awareness system may store the information such that it can be accessed by services of the virtual infrastructure management system 150.

At act 670 of exemplary process 600, the virtual infrastructure management system 150 may access the stored data to execute various services. These services include application specific data backup, application specific data recovery, resource allocation, and monitoring as discussed with reference to FIG. 1 above. It is appreciated that by providing these services with information about the application configuration on the virtual entity, the operations associated with the services may become significantly more efficient and accurate.

Figure 13A:
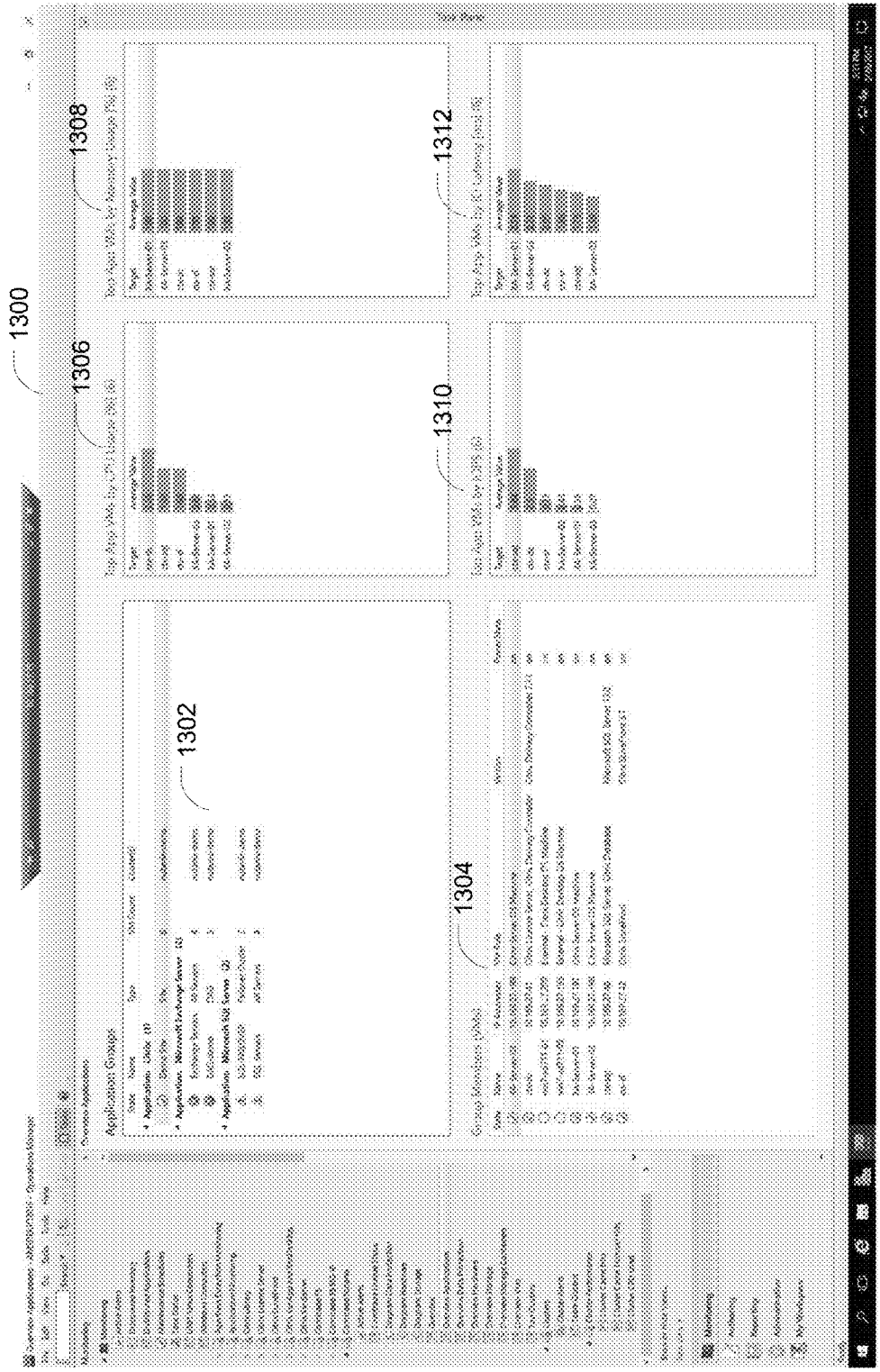
FIGS. 13A-13B are sketches of exemplary computer user interfaces through which a monitoring application displays on a computer screen information collected in accordance with some embodiments described herein.
Figure 13B:
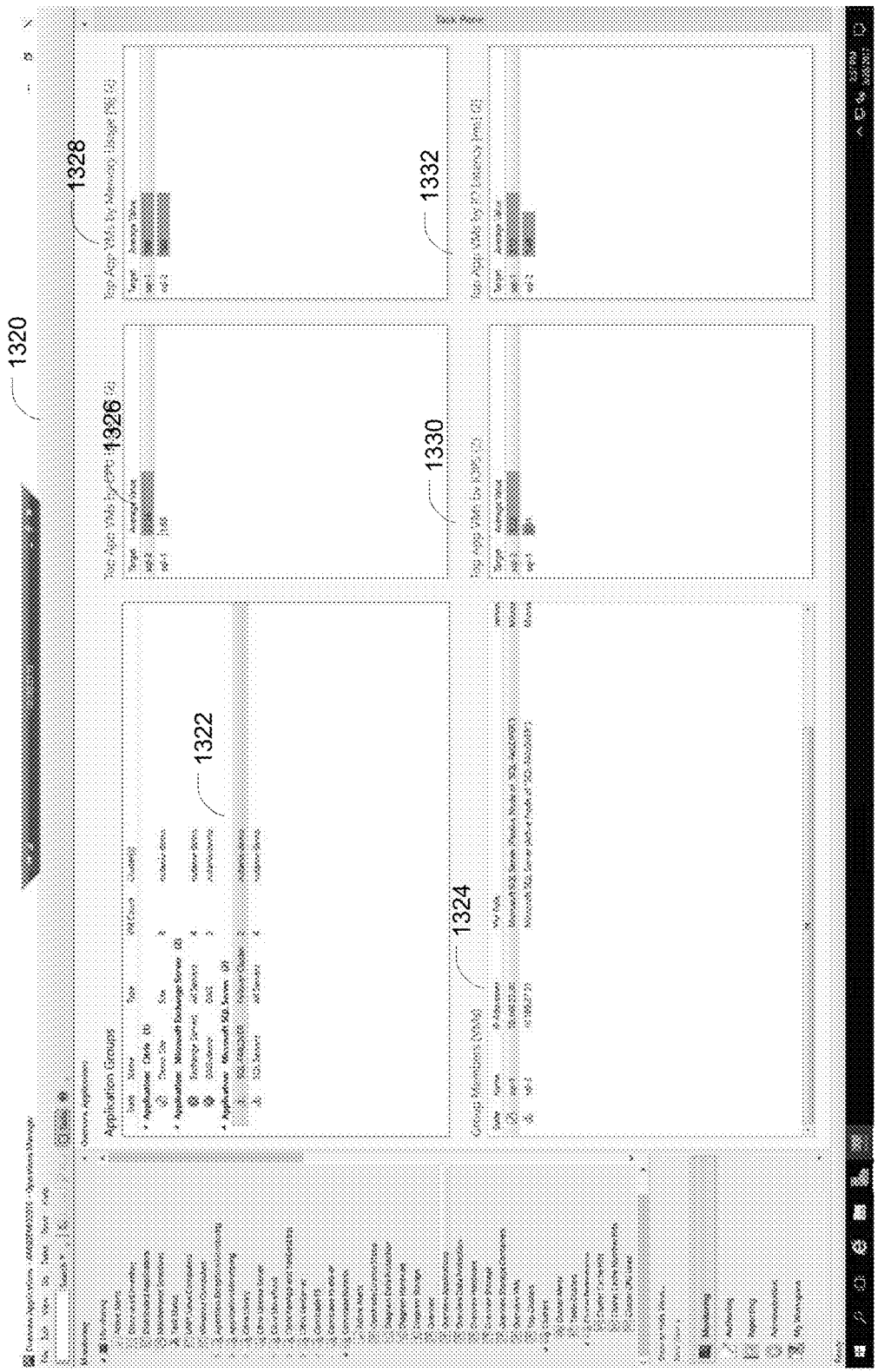

FIGS. 13A-13B illustrate an example embodiment of a monitoring service application interface that displays information that may be collected by an application awareness system as described herein (e.g. through process 600).

FIG. 13A illustrates information collected about a group of virtual entities and applications running on the group of virtual entities. At 1302, the interface displays groups of virtual entities that may be viewed according to site or application. The application (e.g. Microsoft Exchange Server, Microsoft SQL Server) may be distributed across a plurality of virtual entities. At 1304, the interface displays all the virtual entities in the site. The screen displays IP addresses, names, and roles of the each virtual machine for distributed applications. At 1306, 1308, 1310, 1312 the interface displays resource usage of the virtual machines. The interface displays the most resource intensive virtual entities in terms of CPU usage 1306, memory usage 1308, input/output operations per second (IOPS) 1310, and latency 1312.

FIG. 13B illustrates information collected about a group of virtual entities running a distributed installation of Microsoft SQL Server. The system (e.g. system 110) has determined that the application on the virtual entities is configured for failover purposes as displayed at 1322. Additionally, the system has determined that the application is distributed across a group of two virtual entities shown at 1324 along with their roles for the application. The system has determined one virtual entity is a passive node and that the other is the failover node. Furthermore, the system has calculated resource usage of each virtual entity as shown at 1326, 1328, 1330, 1332. It is evident, for example, that the virtual entity acting as the active node is using more CPU resources 1326 and conducting more TOPS 1330. The displayed information be used, for example, by an administrator to monitor the virtual infrastructure.

Figure 8:
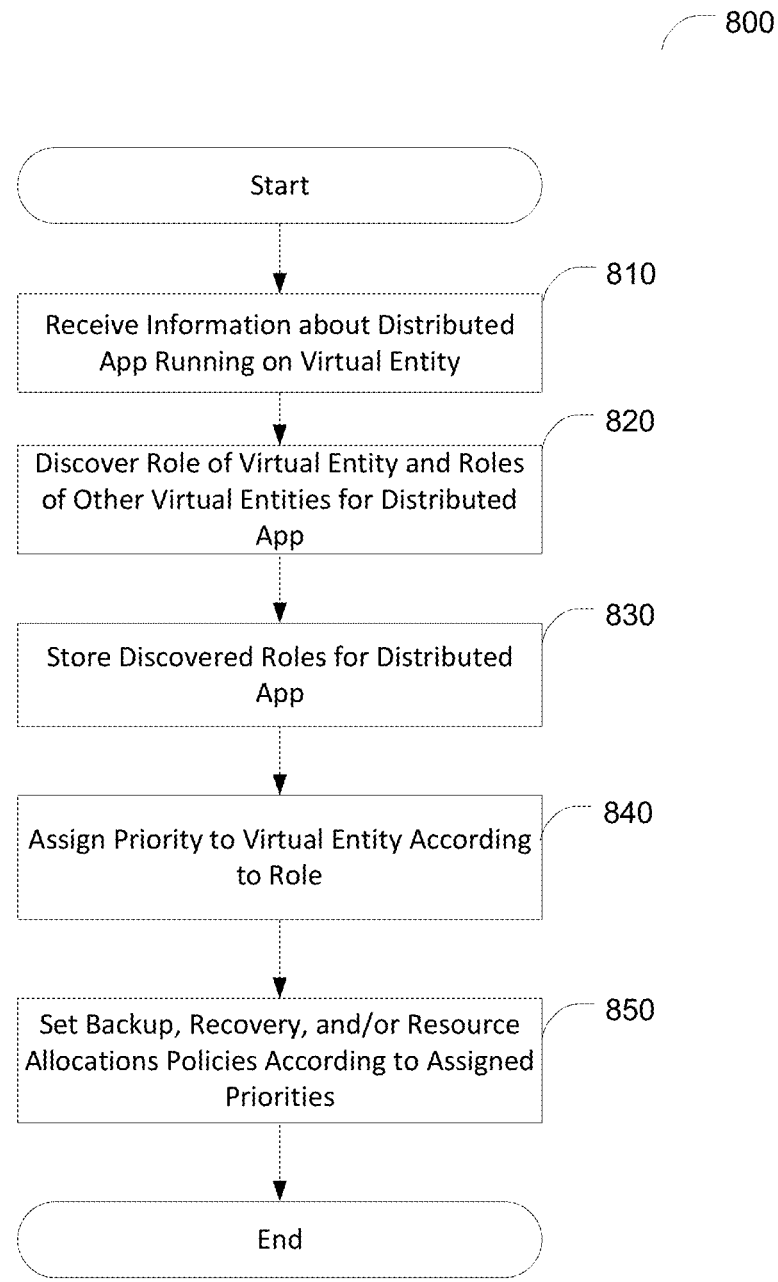
FIG. 8 is a flow chart of an exemplary process 800 to discover and use a role of a virtual entity in a distributed application in accordance with some embodiments described herein.

FIG. 8 illustrates an exemplary process 800 that a system may execute in order to discover and use a role of a virtual entity in a distributed application. The process 800 may be executed by a suitable system such as system 110 discussed above with reference to FIG. 1.

Exemplary process 800 begins at act 810, where the application awareness system receives information about a distributed application installed on a virtual entity. The information may be acquired using any of the methods or processes described herein. One or more methods, for example, may include running of one or more application probes to collect information about the distributed application. One example process that the system may use is exemplary process 600 described in reference to FIG. 6 above. Further, an example of information that may be received is illustrated and described above with reference to FIG. 7.

Next, process 800 proceeds to act 820, where the application awareness system discovers a role for the virtual entity in the distributed application using the received information. The application awareness system may process the received information to search for a definition of the virtual entity role in a configuration of the application. In one example, the application awareness system may receive information comprising an output result from execution of one or more remote scripts. The scripts may comprise PowerShell or Bash scripts. The result of the script may output information about the distribution of the application.

In some embodiments, the received information may include information about a topology of the distributed application. Referring to FIG. 7, information sample 720 illustrates an example of received information 720 from an application probe for XenDesktop. The information 720 includes topology information that comprises a list of hosts for the application 724 and a list of roles for each of those hosts 726. The application awareness system may match a host name 722 of the virtual entity for the application with a name on the list 724 to discover a role for the virtual entity in the distributed application. In information sample 720, for example, the application awareness system may discover that the virtual entity host name for the XenDesktop application is 'scom-xd01-ng' and search the lists 724 and 726 to discover that this name corresponds to a "Delivery Controller" role of the application.

In some embodiments, the application awareness system may have a predefines set of fields, terms, keys, and other parameters for which it looks up and searches for in a set of received information. Each probe may have a known standard response for which the application awareness system may have a preprogrammed set of actions to analyze the received response information with. Referring again to received information sample 720 illustrated in FIG. 7, the application awareness system may have predefined program instructions by which it searches one or more areas of the response to retrieve application awareness data. The application awareness system may, for example, have a programmed instructions that, when executed by the application awareness processor 112, retrieve a host name and map the host name to a role as described above.

Next, exemplary process 800 proceeds to act 830 and 840, where the application awareness system stores the discovered role and then uses it to assign a priority to the virtual entity. At act 830, the application awareness system may store the role of the virtual entity for an application. The system may analyze one or more other virtual entities to discover each of their roles in the respective application. The application awareness system may store the roles of all virtual entities across which the application is distributed. The application awareness system may, for example, have a mapping of virtual entities to roles for a given distributed application.

Next, at act 840, the application awareness system proceeds to assign a priority to the virtual entity for a specific distributed application based upon a role of the virtual entity in the distributed application. The application awareness system may, for example, have a predefined ranking of importance of each role for a distributed application. The application awareness system may use that ranking to assign a priority to each virtual entity across which the distributed application is distributed. The assigned priority may comprise a ranking, score, or other parameter to indicate relative level of criticality of the virtual entity for the distributed application. Referring again to sample received information 720 illustrated in FIG. 7, the system may assign a priority to each host in the list of hosts 724 based on the role 726 of each host.

Next, the process 800 proceeds to act 850, where the application awareness system may set backup, recovery, and/or resource allocation policies according to the assign priorities. Act 850 may be executed by the application awareness system 110 or alternatively by the virtual infrastructure management system 150, each of which are described above in reference to FIG. 1. The system may give higher preference to the virtual entity for data backup, data recovery, and/or resources based on a higher priority level. Conversely, the system may give lower preference based on a lower priority level. If, for example, the virtual entity is discovered as a primary node of a distributed application, it may be assigned the highest priority. In this case, it may be allocated the greatest computation resources such as memory and processor usage. Further, its data may be backed up with greater frequency. The virtual entity's recovery of data may also be given preference over that of other virtual entities based on its assigned priority level.

It is appreciated that methods of discovering virtual entity roles and assigning priorities are not limited to the example methods described above. A system may use any suitable method for discovering virtual entity roles and use any suitable method for assigning a priority to the virtual entity. Further, the system may use additional parameters outside of the virtual entity role to determine a priority.

Figure 9:
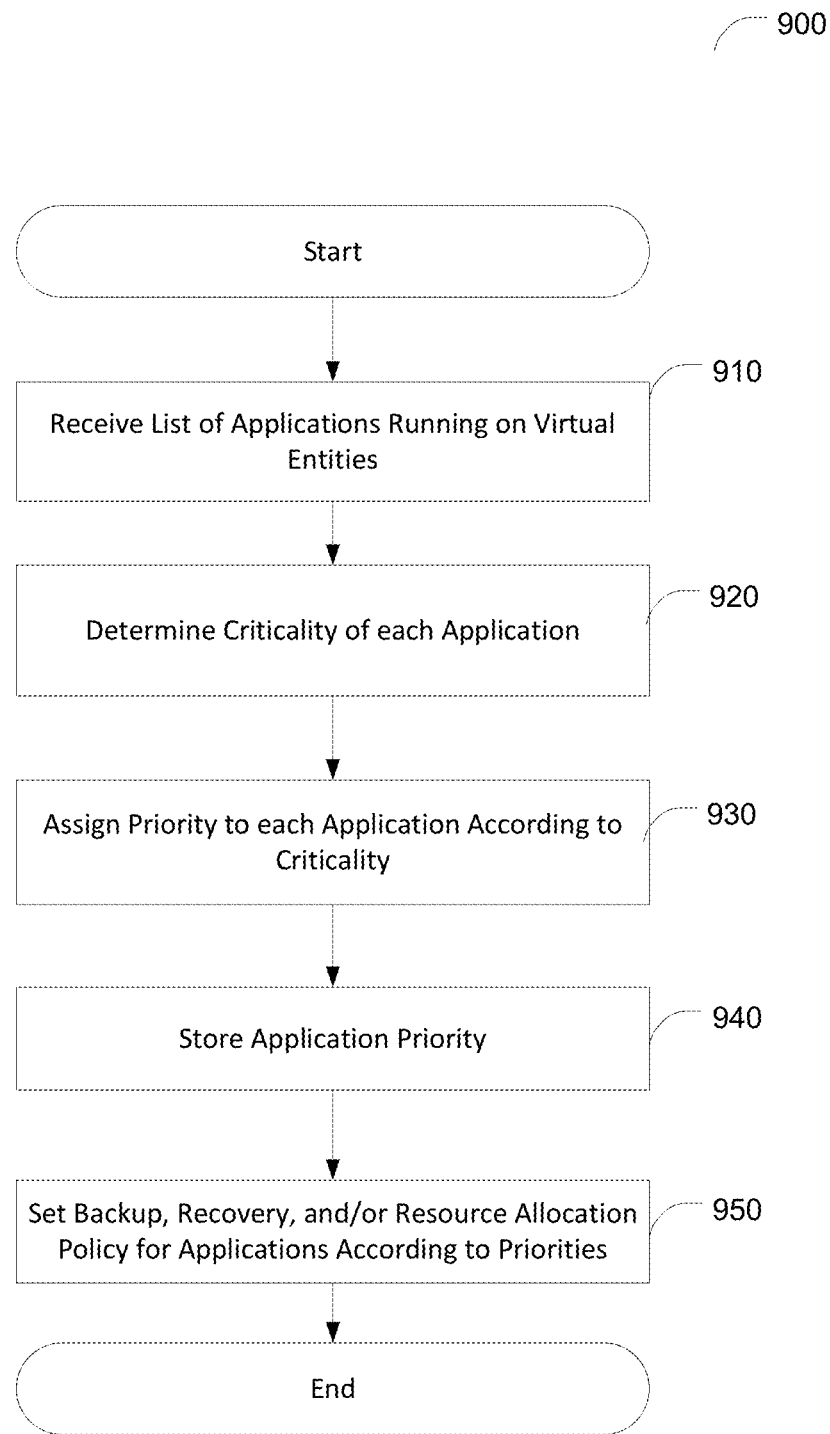
FIG. 9 is a flow chart of an exemplary process 900 to assign priorities to applications that may be running on one or more virtual entities in accordance with some embodiments described herein.

FIG. 9 illustrates an exemplary process 900 in which a system receives a list of applications installed on one or more virtual entities, determines a criticality of each application, and then assigns a priority to one or more virtual entities for use in other processes. The exemplary process 900 may be executed by application awareness system 110 discussed above with reference to FIG. 1.

Exemplary process 900 begins with act 910, where the application awareness system receives a list of applications installed on a virtual entity. The application awareness system may acquire this list by carrying any one or more of techniques described herein to discover applications on the virtual entity. One example method that the application awareness system may use is process 400 described in reference to FIG. 4 above.

At act 920 of exemplary process 900, the application awareness system determines a criticality of each application that is installed on the virtual entity. The application awareness system may maintain a level of importance for one or more applications that it searched for in the application discovery stage. The level of importance may be pre-configured. For example, a user such as an IT administrator may input levels of importance for one or more applications. The system may use the importance levels to determine a criticality of the virtual entity. The application awareness system may have a predefined stored ranking that indicates that Microsoft Exchange is of higher importance than is SQL Server.

Next, the exemplary process 900 proceeds to act 930, where the application awareness system may assign a priority to one or more virtual entities according to criticalities of applications, or the components of applications, on the virtual entities. For virtual entities that have installed applications that are deemed more critical by the system, the application awareness system may assign the virtual entities a higher priority. Conversely virtual entities that have installed applications that are deemed less critical may be assigned a lower priority. The priority may comprise a rank, score, or other parameter. In the example that one virtual entity is discovered to have Microsoft Exchange and a second virtual entity is determined to have SQL Server installed on it, the system may assign a higher priority to the virtual entity having Microsoft Exchange installed than the virtual entity with SQL Server installed based on a determination that the criticality of Microsoft Exchange is higher than that of SQL Server.

Next, the exemplary process 900 proceeds to act 940, where the application awareness system may store the priority for the virtual entities. The application awareness system may maintain a mapping of virtual entities and their priority for one or more virtual entities in a virtual infrastructure containing multiple virtual entities. The application awareness system may, for example, maintain a record of all discovered applications on the virtual entity and one or more priority parameters for the virtual entity. The information may be stored in a dataset such as database 124 described above in reference to FIG. 1.

Next, the exemplary process 900 proceeds to act 950, where a system may set backup, recovery, and/or resource allocation policies for the virtual entities according to their priorities. The policies may be set by application awareness system 110 or virtual infrastructure management system 150, each of which are described above with reference to FIG. 1. The system executing act 950 may set policies for one or more services using the application priorities. The system may, for example, backup data for virtual entities of higher priority more frequently. The system may additionally or alternatively allocate more computation resources to higher priority virtual entities. Also, the system may make data associated with higher priority virtual entities more readily recoverable.

Figure 10:
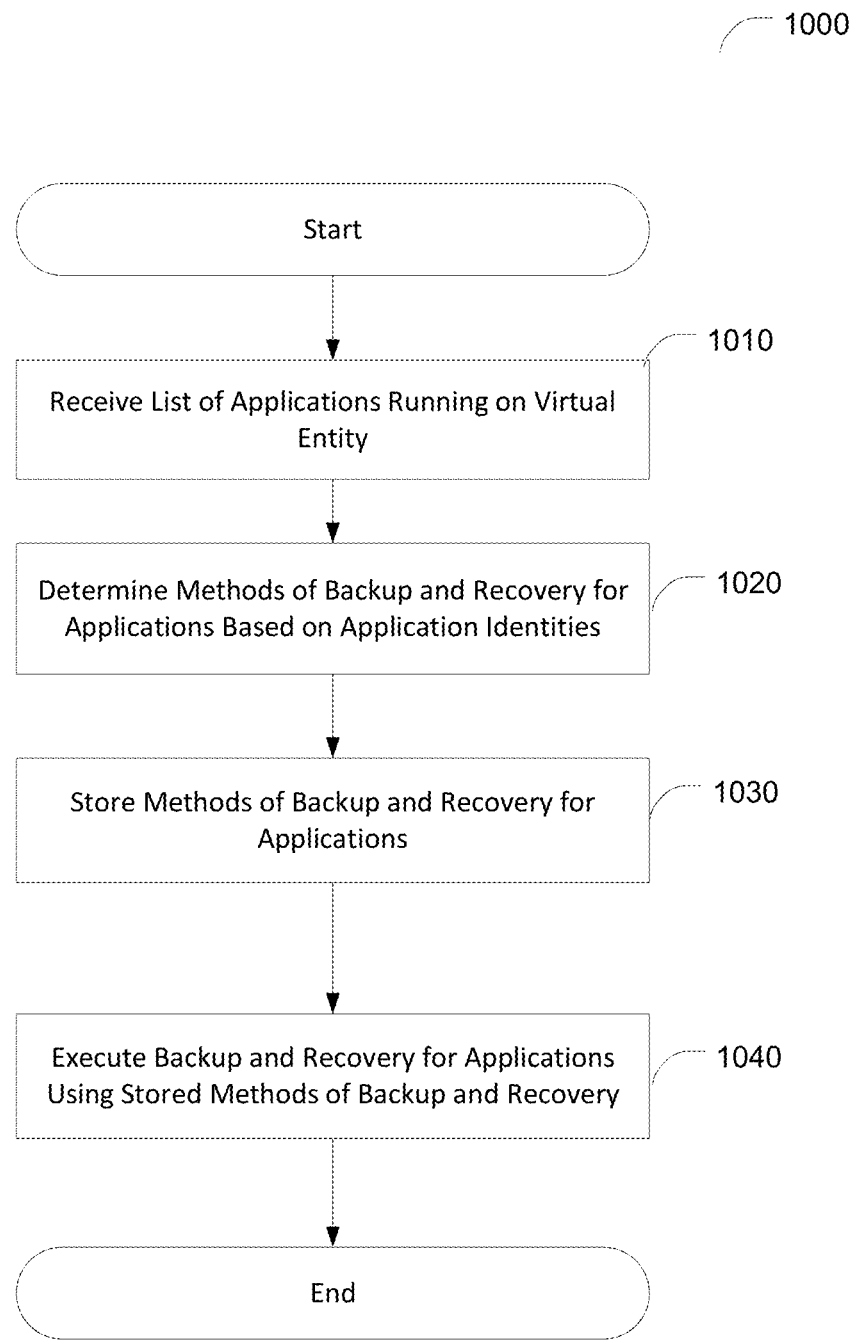
FIG. 10 is a flow chart of an exemplary process 1000 to use application awareness information to execute application specific backup and/or recovery in accordance with some embodiments described herein.

FIG. 10 illustrates an exemplary process 1000, where a system, such as a virtual infrastructure management system 150, may use knowledge of which applications are installed on a virtual entity to determine application specific back and recovery methods for the applications installed on the virtual entity. The process 1000 may be executed by one or more suitable systems. In some embodiments, the process 1000 may be executed by application awareness system 110 described above with respect to FIG. 1. In another embodiment, the process 1000 may be executed by the virtual infrastructure management system 150.

Exemplary process 1000 begins with act 1010, where the system executing process 1000 may receive a list of applications that are installed on a virtual entity. The system may acquire this list by carrying any one or more of suitable methods to discover applications on the virtual entity. One example method that the system may use is process 400 described in reference to FIG. 4 above.

Next, exemplary process 1000 proceeds to act 1020, where the system may determine methods of backup and recovery for one or more of the discovered applications based on knowledge of their identities. It is appreciated that in current systems, a single backup and/or recovery method may be use to execute backup and recovery services for all applications on a virtual entity without any suitable modifications for each application. This may result in inefficient use of computational resource and may require manual processes to refine results from the backup and/or recovery.

In some embodiments, the system may have a predefined set of storage and/or recovery methods for each application that it conducts application discovery for on a virtual entity. The system may use knowledge of the application identities to assign backup and/or recovery methods for the application, In some embodiments, the system may further use information it gathers about configurations of each application on the virtual entity to assign backup and/or recovery methods. The system may have multiple methods that it can assign for a single application based on a configuration of the application on a specific virtual entity. In one example, a system may store one or more backup and/or recovery policies for SQL Server, Exchange, and XenDekstop applications. Upon discovering that one or more of these applications is installed on a virtual entity, may assign methods for each application. Further, the system may refine the assigned policies based on specific configurations of each application on the virtual entity as determined using, for example, application probes such as probe 116 described with reference to FIG. 1 above.

Next, exemplary process 1000 proceeds to act 1030, where the system may store the determined methods of backup and/or recovery for the applications installed on the virtual entity. The system may maintain a record of applications installed for multiple virtual entities. The system may further maintain a record of data backup and/or recovery methods to use for the virtual entity for the applications discovered to be installed on the virtual entity. The system may store this information in a database such as database 124 described above in reference to FIG. 1.

Next, exemplary process 1000 proceeds to act 1040, where the virtual infrastructure management system 150 may execute backup and recovery for one or more applications on the virtual entity using the stored methods. A system, such as virtual infrastructure management system 150, may access the stored record of applications and corresponding methods for each application when executing application data backup and recovery for the virtual entity. For example, the system may be scheduled to back up data for the SQL Server application. For a respective virtual entity, the system may first look up in the database whether the application exists on the respective virtual entity. If the application does exist, the system may proceed to execute data backup for the application according to the determined method stored for that application.

It is appreciated that by having knowledge of whether certain applications are installed on a virtual entity the system may avoid unnecessary computations or attempted computations on the system. Furthermore, the system may execute actions more efficiently using application specific methods than using a brute force approach used in current systems.

Figure 14A:
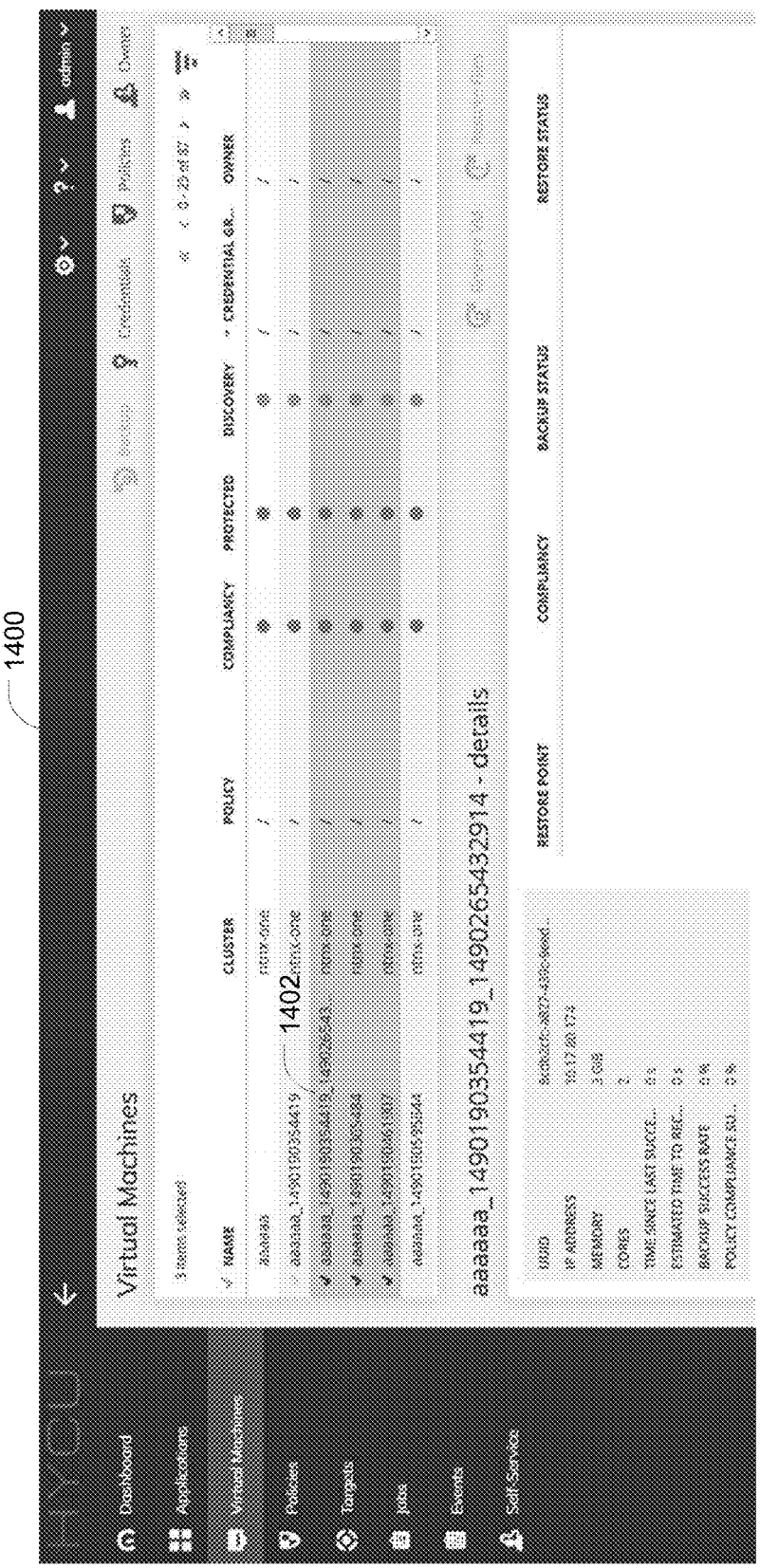
FIGS. 14A-14B are sketches of exemplary embodiments of a computer user interfaces through which a user may set back up policies of a data backup application, in accordance with some embodiments described herein.
Figure 14B:
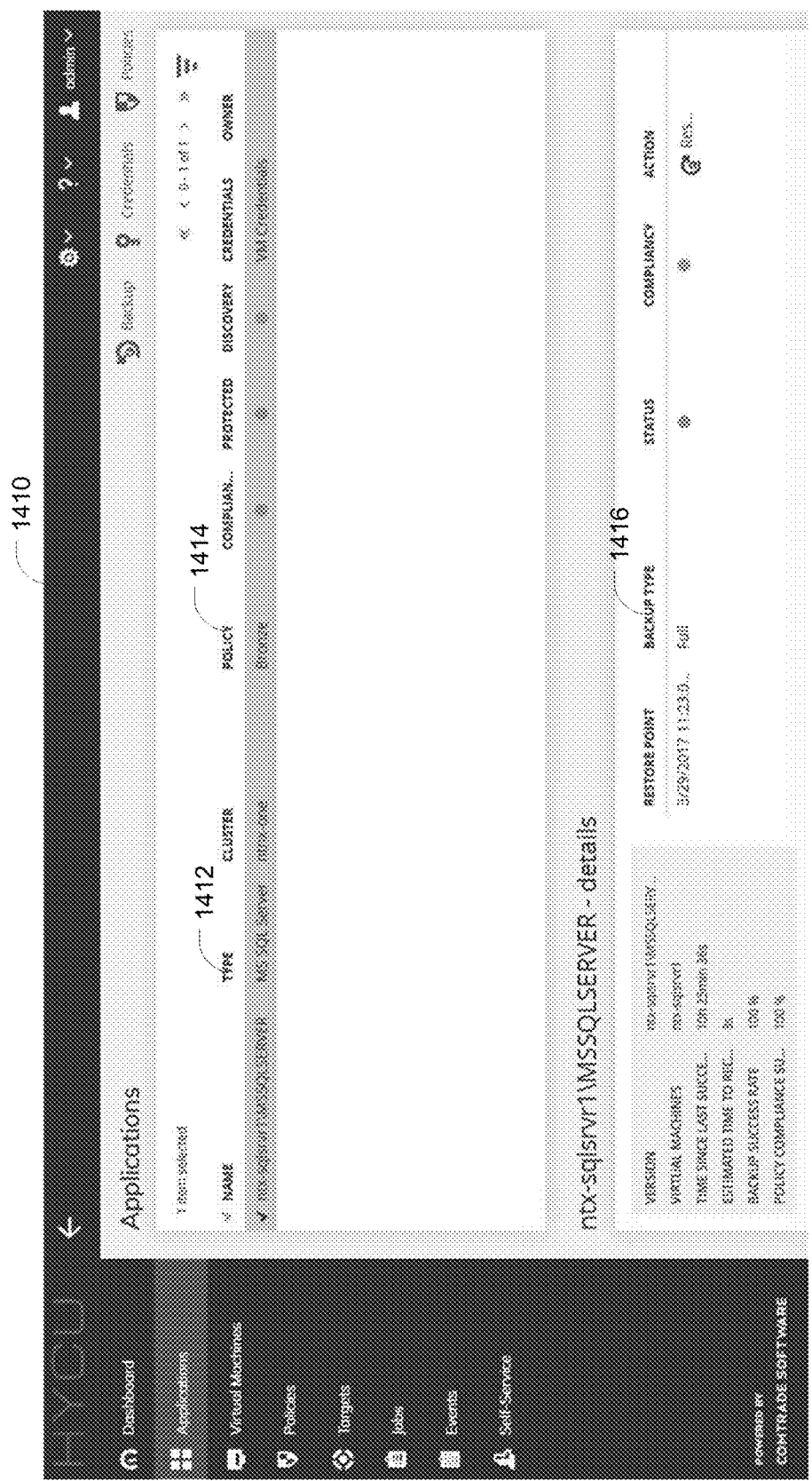

FIGS. 14A-14B illustrate example screens of a backup application that may be executed using information collected from a system such as application awareness system 110 described above with respect to FIG. 1.

FIG. 14A illustrates a screen 1400 in which a user can select one or more virtual entities 1402 to which a backup policy is to be applied. In this example, the virtual entities are virtual machines. In some embodiments the system may have collected information necessary to set backup policies for the virtual entities and determined a method of backup for the application (e.g. during process 900 or 1000). The system may suggest a default backup policy or policies for virtual entities. The screen 1410 may display defaults assigned by the system. A user may then apply the backup policy. Screen 1410 illustrates a view of the backup application illustrating an application for which a particular data backup policy has been applied. The Microsoft SQL Server application 1412 has a bronze backup policy 1414 applied which indicates a full backup 1416.

Embodiments herein are not restricted to only providing application specific methods for application backup and recovery. Application specific methods may be provided for any number of services and/or operations associated with a virtual infrastructure. Furthermore, embodiments are not limited to any number or type of methods that may be used for any given application. Any suitable method or combination of methods may be used for a given application.

In some embodiments, the application awareness system may control scheduling of execution of application discovery activities. In one embodiment, a schedule of activities may be user configurable. The application awareness system may be configured by a user to run application awareness processes continuously according to a defined schedule, on demand, in response to a detected trigger condition(s). The trigger condition(s) can include any suitable trigger such as detected change in environment, detected need for configuration information, or other trigger. For example, the application awareness system may detect addition of a new virtual entity to a virtual infrastructure. In response, the application awareness system may be configured to execute application discovery processes for one or more virtual entities of the virtual infrastructure.

Figure 11:
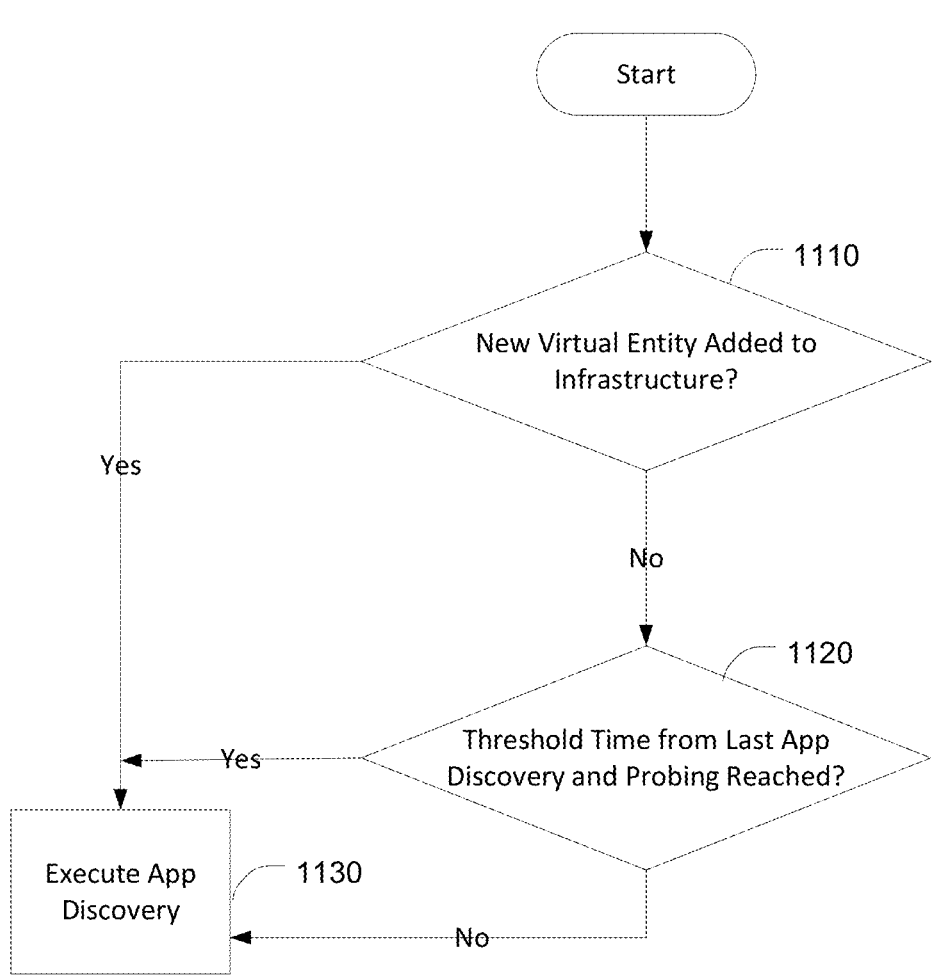
FIG. 11 is a flow chart of an exemplary process 1100 for determining when to execute application discovery and/or probing activities in accordance with some embodiments described herein.

FIG. 11 illustrates an exemplary process 1100 that a system may use to determine when to execute application discovery and probing. The exemplary process may be executed by any suitable system. One example embodiment of a system that may carry out the process is application awareness system 110 described with reference to FIG. 1 above.

Exemplary process 1100 may begin at act 1110, where the system may determine whether a certain change has occurred in a virtual infrastructure such as virtual infrastructure 130 discussed in reference to FIG. 1 above. In one embodiment, the system may determine whether a new virtual entity has been added to the virtual infrastructure. In other embodiments, the system may look for other changes such as updates to virtual infrastructure hardware, software, or other events.

If the system detects the occurrence of a certain change in the virtual infrastructure 1110 such as addition of a new virtual entity 1110, Yes, the process 1110 may proceed to act 1130. In act 1130, the system may execute application discovery and/or probing activities. Example embodiments of activities and processes executed for application discovery and probing are described in discussions of embodiments above.

If the system detects that a threshold amount of time has been reached since the last execution of application discovery and probing operations 1120, Yes, the process 1110 may proceed to act 1130. In act 1130 the system may execute application discovery and/or probing activities. Example embodiments of activities and processes executed for application discovery and probing are described in discussions of embodiments above.

If, however, the system does not detect that a threshold amount of time has been reached since the last execution of application discovery and probing operations 1120, No, the process 1100 may return to act 1110. The system may continuously execute exemplary process 1100 in order to maintain an updated record of applications installed on the virtual entities of the virtual infrastructure. The updated record may ensure efficient execution of management activities executed on the virtual infrastructure by a virtual infrastructure management system such as system 150 discussed above with reference to FIG. 1.

If the system does not detect the occurrence of a certain change in the virtual infrastructure 1110, No, the process 1100 may proceed to act 1120, where the system determines whether a threshold amount of time has been reached since the last time that application discovery and probing operations were executed. The system may have a scheduled time interval at which it must execute application discovering and probing activities in order to maintain an up to date record for use by virtual infrastructure management services. Application discovery and probing processes may include many processes and operations. Example embodiments of such processes and operations are discussed above.

As described above in reference to FIG. 1, a virtual infrastructure can include multiple virtual entities. A virtual entity may comprise a virtual machine or a container as mentioned above.

Figure 12:
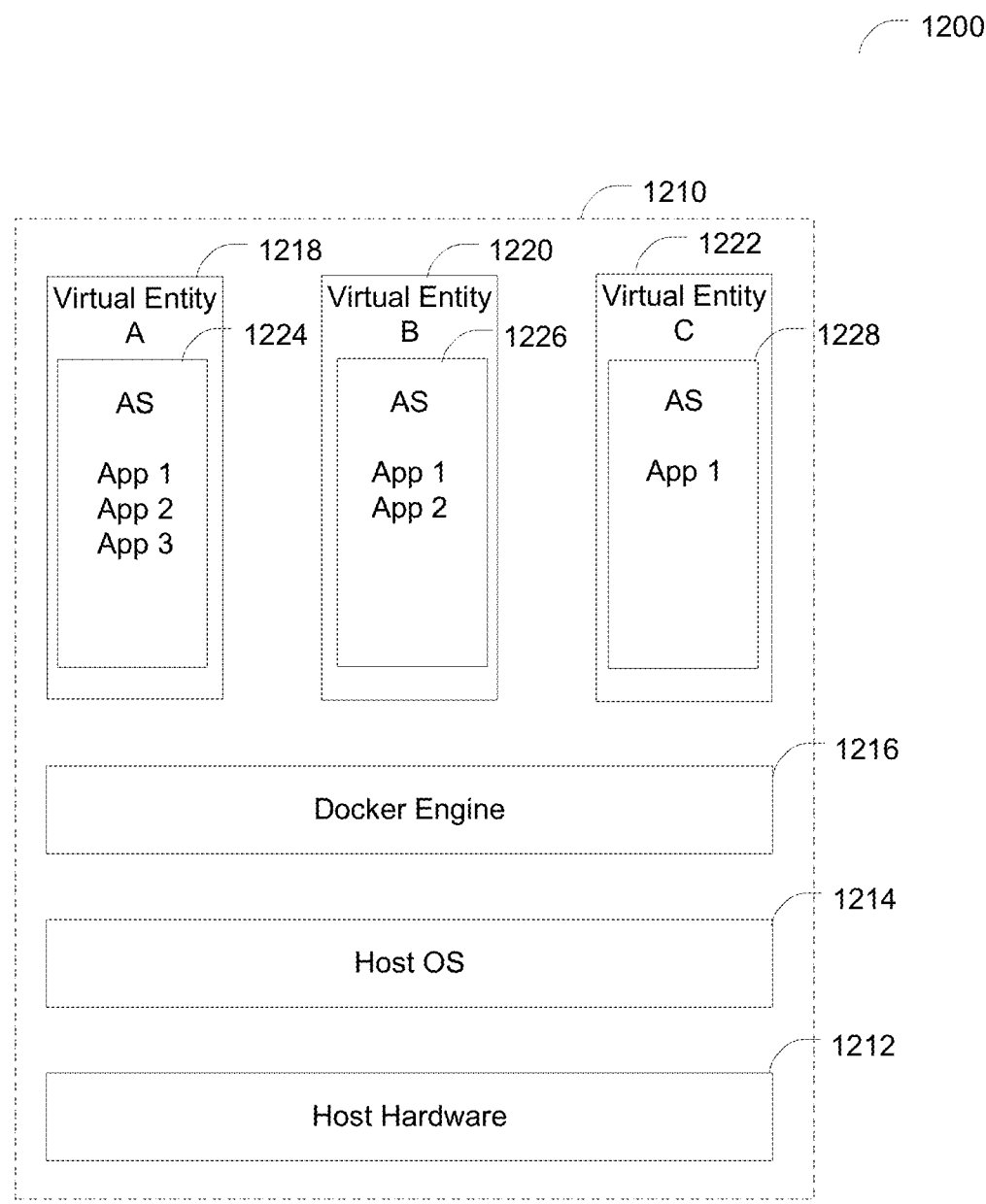
FIG. 12 is a block diagram of an exemplary container based system 1200 for hosting virtual entities that may be accessed in accordance with some embodiments described herein.

FIG. 12 illustrates an example system 1200 that hosts a plurality of virtual entities, each of the virtual entities comprising a container. A container based system 1210 may comprise host hardware 1212, a host OS 1214, a Docker engine 1216, and one or more containers 1218, 1220, 1222. Each of the containers run with a single control hos OS 1214 and access a single OS kernel. Given that each of the containers shares the same OS kernel, the containers do not require a unique OS as virtual machines do. As a result, containers may include files for applications that are installed on the container without a unique OS. Each container may contain state data for the OS kernel of the container. The state data may include a registry of applications installed on the container or other data set revealing information about installed applications.

Each of the containers may have their own unique set of applications 1224, 1226, 1228. Each container may have a plurality of applications installed on the container. Applications may be distributed across more than one container. Embodiments discussed herein with regard to application discovery and probing of virtual entities may be used for application discovery and probing of containers. Information and data gathered may be stored and used as described in discussions of embodiments.

It is appreciated that containers may load and remove applications more efficiently and frequently than other virtual entities. As a result, application discovery and application probing may be especially valuable for virtual infrastructures that include containers. With virtual entities that change more frequently, application discovery and probing systems described in embodiments herein provide information to allow virtual infrastructure services to be executed more efficiently.

A virtual entity comprising a container may have its own identity in a virtual infrastructure. For example, the container may have its own IP address. An application awareness system in accordance with embodiments described herein (e.g. system 110) may execute application discovery and probing processes as described above. In other cases, a plurality of containers 1218, 1220, 1222 may share an IP address. In some embodiments, the application awareness system may first discover a structure of containers using a host OS 1214 in order to uniquely identify each container. The application awareness system may then identify a unique identification of each container. The application awareness system may, for example, execute operations on the host OS to discover each container within the structure. The application awareness system may then identify a unique name of each container within the structure. The application awareness system may then execute one or more of the processes described above in order to collect application awareness information from each container.

It should be appreciated that various concepts and systems disclosed above may be implemented in any of numerous ways, as the concepts are not limited to any particular manner of implementation. For instance, the present disclosure is not limited to the other particular arrangements of components shown in the various figures, as other arrangements may also be suitable. Such examples of specific implementations and applications are provided solely for illustrative purposes.

Figure 16:
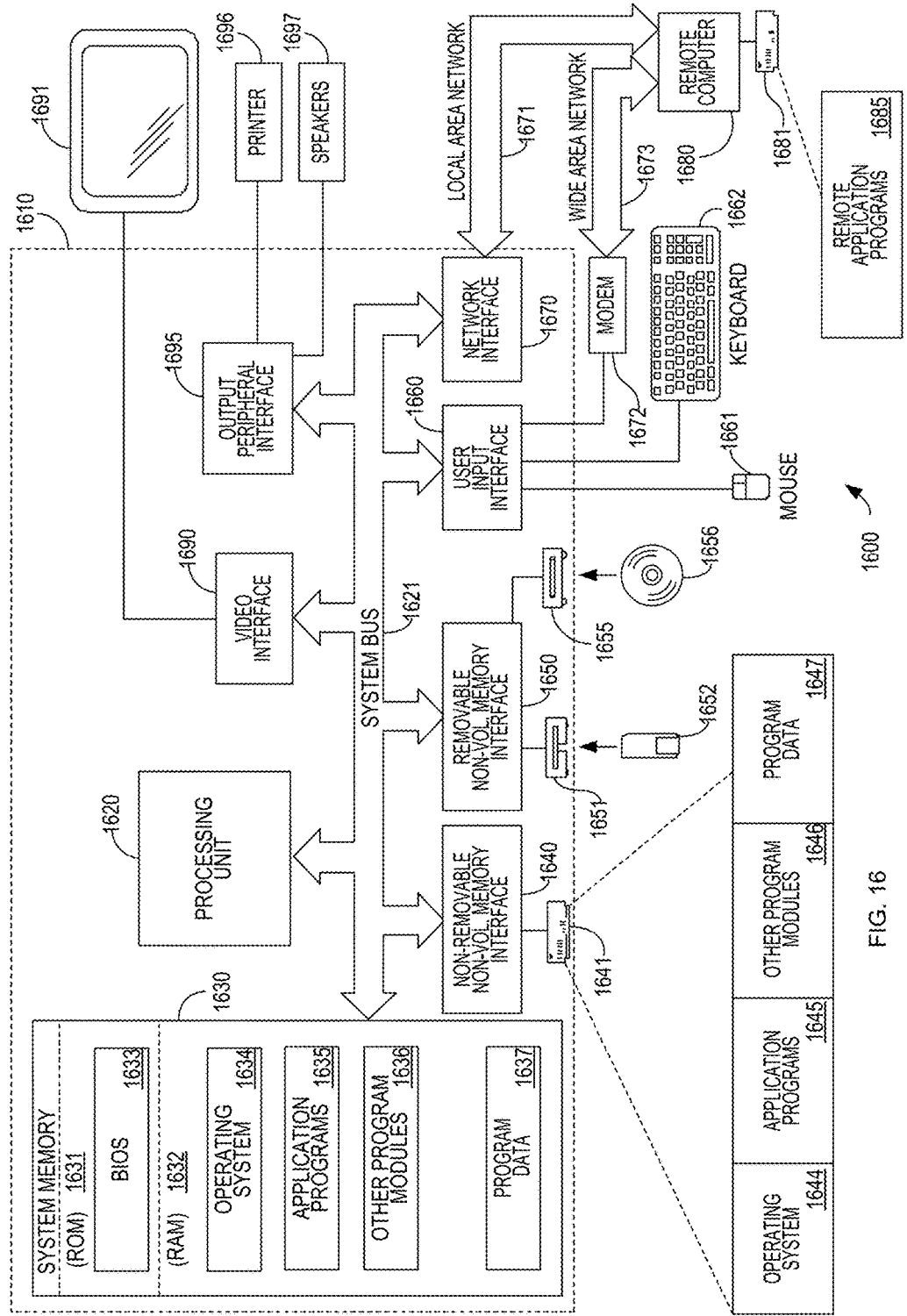
FIG. 16 is a block diagram of an example computer system which may be used to implement embodiments described herein.

FIG. 16 illustrates an example of a suitable computing system environment 1600 on which the invention may be implemented. The computing system environment 1600 is only one example of a suitable computing environment and is not intended to suggest any limitation as to the scope of use or functionality of the invention. Neither should the computing environment 1600 be interpreted as having any dependency or requirement relating to any one or combination of components illustrated in the exemplary operating environment 1600.

The invention is operational with numerous other special purpose computing system environments or configurations, which, in some embodiments, may be created by programming a general purpose computing device. Examples of wellknown computing systems, environments, and/or configurations that may be suitable for use with the invention include, but are not limited to, personal computers, server computers (including those implementing cloud computing or data services), smartphones, tablets, hand-held or laptop devices, multiprocessor systems, microprocessor-based systems, set top boxes, programmable consumer electronics, network PCs, minicomputers, mainframe computers, distributed computing environments that include any of the above systems or devices, and the like. Some of the elements illustrated in FIG. 16 may not be present, depending on the specific type of computing device. Alternatively, additional elements may be present in some implementations.

The computing environment may execute computer-executable instructions, such as program modules. Generally, program modules include routines, programs, objects, components, data structures, etc. that perform particular tasks or implement particular abstract data types. Some embodiments may also be practiced in distributed computing environments where tasks are performed by remote processing devices that are linked through a communications network. These distributed systems may be what are known as enterprise computing systems or, in some embodiments, may be "cloud" computing systems. In a distributed computing environment, program modules may be located in both local and/or remote computer storage media including memory storage devices.

With reference to FIG. 16, an exemplary system for implementing the invention includes a general purpose computing device in the form of a computer 1610. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 1610 typically includes a variety of computer readable media. Computer readable media can be any available media that can be accessed by computer 1610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1610.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, may be stored in ROM 1631. RAM 1632 may contain data and/or program modules that are immediately accessible to and/or presently being operated on by processing unit 1620. By way of example, and not limitation, FIG. 16 illustrates operating system 1634, application programs 1635, other program modules 1636, and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media. Such a hard disk drive may be implemented by a rotating disk drive or as a solid state drive, such as is implemented with FLASH memory.

FIG. 16 also illustrates a slot 1651 that reads from or writes to a removable, nonvolatile memory 1652, such as a memory stick or FLASH memory, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 may be connected to the system bus 1621 through a non-removable memory interface such as interface 1640, and slot 1651 and optical disk drive 1655 may be connected to the system bus 1621 by a removable memory interface, such as interface 1650. However, it should be appreciated that, in some embodiments, some or all of the computer readable media available to a device may be accessed over a communication network.

The drives and their associated computer storage media discussed above and illustrated in FIG. 16, provide storage of computer readable instructions, data structures, program modules and other data for the computer 1610. In FIG. 16, for example, hard disk drive 1641 is illustrated as storing operating system 1644, application programs 1645, other program modules 1646, and program data 1647. Note that these components can either be the same as or different from operating system 1634, application programs 1635, other program modules 1636, and program data 1637. Operating system 1644, application programs 1645, other program modules 1646, and program data 1647 are given different numbers here to illustrate that, at a minimum, they are different copies.

A computing environment may include one or more input/output devices. Some such input/out devices may provide a user interface. A user may enter commands and information into the computer 1610 through input devices such as a keyboard 1662 and pointing device 1661, depicted as a mouse. However, other forms of pointing devices may be used, including a trackball, touch pad or touch screen. Other input devices (not shown) may include a microphone, joystick, game pad, satellite dish, scanner, or the like. The microphone, for example, may support voice input, which may be recorded as an audio file or may be translated, such as using speech recognition, to a text format for further processing. These and other input devices are often connected to the processing unit 1620 through a user input interface 1660 that is coupled to the system bus, but may be connected by other interface and bus structures, such as a parallel port, game port or a universal serial bus (USB).

The computing device may include one or more output devices, including an output device that may form a portion of a user interface. A monitor 1691 or other type of display device may also connected to the system bus 1621 via an interface, such as a video interface 1690, to form a visual output device. In addition to the monitor, computers may also include other peripheral output devices such as speakers 1697 and printer 1696, which may be connected through an output peripheral interface 1695. The speaker, for example, may enable output via synthesized voice or in any other suitable way.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include a local area network (LAN) 1671 and a wide area network (WAN) 1673, but may also include other networks. Such networking environments are commonplace in offices, enterprise-wide computer networks, intranets and the Internet. Alternatively or additionally, the WAN may include a cellular network.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660, or other appropriate mechanism.

In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary and other means of establishing a communications link between the computers may be used.

Depending on the nature of the computing device, one or more additional elements may be present. For example, a smart phone or other portable electronic device may include a camera, capable of capturing still or video images. In some embodiments, a computing device may include sensors such as a global positioning system (GPS) to sense location and inertial sensors such as a compass, an inclinometer and/o ran accelerometer. The operating system may include utilities to control these devices to capture data from them and make it available to applications executing on the computing device.

As another example, in some embodiments, a computing device may include a network interface to implement a personal area network. Such an interface may operate in accordance with any suitable technology, including a Bluetooth, Zigbee or an 802.11 ad hoc mode, for example.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for gathering information from a distributed computer system implementing a virtual infrastructure, the virtual infrastructure comprising a plurality of virtual entities, and the system comprising:
  a network interface;
  a memory;
  at least one processor operatively connected to the network interface and the memory; and a non-transitory computer readable medium comprising computer executable instructions, that, when executed by the at least one processor, implement:
    a controller;
    an application discovery component configured to:
      execute, via the network interface, a protocol associated with an operating system of a plurality of operating systems to establish a control path with the operating system, wherein the operating system is running on a virtual entity of the plurality of virtual entities;
      transmit, via the control path, a first set of program instructions to the virtual entity that, when executed by the virtual entity, query an application registry associated with the operating system of the virtual entity for information associated with one or more applications;
      receive, via the control path responsive to the query, a first set of data;
      determine, from the first set of data, one or more applications installed on the virtual entity; and
      based on the determination of the one or more applications are installed, selectively store in the memory, information specifying that the one or more applications are installed on the virtual entity;
    a plurality of application probes, each application probe associated with an application and configured to:
      select a second set of program instructions based on at least one of the one or more applications;
      transmit, via the control path, the second set of program instructions to the virtual entity;
      receive, responsive to execution of the second set of program instructions by the virtual entity, a second set data from the virtual entity;
      determine, from the second set of data, a configuration of the at least one of the one or more applications;
      store, in the memory, information specifying the determined configuration of the at least one of the one or more applications; and
      output the configuration information to a virtual infrastructure management system, wherein the virtual infrastructure management system comprises a data backup service or a monitoring service; and
    wherein the controller is configured to:
      execute a first stage in which the controller executes the application discovery component;
      identify, responsive to execution of the first stage, a set of applications determined to be installed on the virtual entity;
      select a set of application probes for execution such that each application probe of the set of application probes is associated with an application of the set of applications; and
      execute a second stage in which the controller executes the set of the plurality of application probes.

2. The system of claim 1, wherein the application discovery component is further configured to:
  transmit, to the virtual entity via the control path, a third set of program instructions that, when executed by the virtual entity, search for a trace of an application on the virtual entity;
  receive, responsive to the execution, a third set of data indicative of whether the trace is detected on the virtual entity; and
  determine, based on the third set of data, if the application is installed on the virtual entity.

3. The system of claim 2, wherein the application discovery component is further configured to transmit the third set of program instructions responsive to determining, from the first set of data, that the application is not installed on the virtual entity.

4. The system of claim 1, wherein the controller is configured to execute the application discovery component and at least one of the plurality of application probes responsive to detecting an addition of a new virtual entity to the virtual infrastructure.

5. The system of claim 1, wherein the non-transitory computer readable medium comprises computer executable instructions, that, when executed by the at least one processor, further implement a scheduler that is configured to execute the application discovery component and at least one of the plurality of application probes responsive to detecting an expiration of a time period.

6. The system according to claim 1, wherein executing the protocol associated with the operating system to establish a control path with the operating system comprises executing the protocol to establish the control path with a kernel of the operating system.

7. A computer-implemented method for gathering information about a virtual infrastructure comprising a plurality of virtual entities, the computer-implemented method comprising:
   executing, in a first stage, by an application discovery component via a network interface, a protocol associated with an operating system of a plurality of operating systems to establish a control path via an interface of the operating system configured for communication according to the protocol, wherein the operating system is running on a virtual entity of the plurality of virtual entities;
   accessing, by the application discovery component via the control path, first data associated with one or more applications in a data set associated with the operating system of the virtual entity;
   determining, by the application discovery component from the first data, that a particular application is installed on the virtual entity;
   selecting an application probe for execution such that the application probe is associated with the application determined to be installed on the virtual entity;
   initiating, in a second stage, by the selected application probe, via the control path, execution of program instructions at the virtual entity;
   receiving, by the application probe second data from the virtual entity generated based on execution of the program instructions at the virtual entity;
   determining, by the application probe based on the second data, a configuration of the particular application on the virtual entity; and
   outputting to a virtual infrastructure management system, the configuration information.

8. The method of claim 7, further comprising determining, by the application probe, that the particular application is distributed across a set of virtual entities.

9. The method of claim 8, further comprising identifying and storing, by the application probe responsive to determining that the particular application is a distributed application comprising a plurality of components, a role of a component of the distributed application installed on the virtual entity.

10. The method according to claim 9, further comprising assigning, by the application probe, a priority to the virtual entity based on the role of the component of the distributed application installed on the virtual entity.

11. The method of claim 7, further comprising determining that the virtual entity has a unique IP address.

12. The method of claim 7, further comprising recognizing that the virtual entity is a container and that the operating system is running on a host machine of the container.

13. The method of claim 12, further comprising determining a structure of one or more containers running on the host machine and identifying an ID of the container.

14. The method of claim 7, further comprising removing the program instructions from the virtual entity and any items produced on the virtual entity as a result of executing the program instructions.

15. A computer-implemented method of collecting application information in a virtual infrastructure, the method comprising:
   executing, in a first stage, by a controller, an application discovery component, the executing comprising transmitting queries to each of a plurality of virtual entities within the virtual infrastructure, wherein the queries are formatted to elicit data from the plurality of virtual entities indicating presence of applications;
   identifying, by the controller, a set of applications determined to be installed on one or more of the plurality of virtual entities;
   selecting, by the controller prior to execution of a second stage, a set of application probes for execution such that each application probe of the set of application probes is associated with an application of the set of applications;
   executing, in the second stage, by the controller, a probe deployment component, the executing comprising communicating to virtual entities of the plurality of virtual entities computer executable instructions;
   executing the computer executable instructions at the virtual entities to retrieve information about application configurations on respective ones of the plurality of virtual entities; and
   storing data about applications running on the plurality of virtual entities and configurations of the applications based on data received in response to the queries and received as a result of executing the computer-executable instructions.

16. The computer-implemented method of claim 15, further comprising:
   assigning computational resources to the plurality of virtual entities based on the data about applications running on the plurality of virtual entities and the configuration of the applications.

17. The computer-implemented method of claim 15, wherein:
   retrieving information about application configurations comprises discovering a role of a component of a distributed application executing on a virtual entity of the plurality of virtual entities.

18. The computer-implemented method of claim 15, wherein:
   transmitting queries to each of the plurality of virtual entities comprises querying operating system registries on the virtual entities.

19. The computer-implemented method of claim 15, wherein:
   the computer executable instructions comprise scripts that are automatically executed on virtual entities upon deployment.

20. The computer-implemented method of claim 15, wherein:
   transmitting queries to each of the plurality of virtual entities is performed on a time schedule.

21. The computer-implemented method of claim 15, wherein:
   transmitting queries to each of the plurality of virtual entities is performed in response to detecting that a virtual entity has been added to the virtual infrastructure.

22. The computer-implemented method of claim 15, wherein:
   transmitting queries to each of the plurality of virtual entities comprises transmitting via a communication mechanism of an operating system of the virtual entities.

23. The method according to claim 15 further comprising, executing application specific data backup on at least one of the plurality of virtual entities based on the set of applications determined to be installed on the at least one virtual entity.

* * * * *

UNITED STATES PATENT AND TRADEMARK OFFICE
CERTIFICATE OF CORRECTION

PATENT NO. : 9,998,339 B1
APPLICATION NO. : 15/607139
DATED : June 12, 2018
INVENTOR(S) : Mladen Brajkovic et al.

Page 1 of 1

It is certified that error appears in the above-identified patent and that said Letters Patent is hereby corrected as shown below:

On the Title Page

Item (73), Assignee should read -- HYCU, INC., Boston, MA (US) --.

Signed and Sealed this
Twelfth Day of March, 2019

Andrei Iancu
*Director of the United States Patent and Trademark Office*